United States Patent [19]
Nakao et al.

[11] Patent Number: 5,249,269
[45] Date of Patent: Sep. 28, 1993

[54] COMMUNICATION NETWORK SYSTEM USING A FUZZY CONTROL PROCESS

[75] Inventors: Toshiro Nakao; Kenji Mino, both of Machida; Kimio Tanaka, Mukou; Masatsune Kohsaka, Otokuni, all of Japan

[73] Assignee: Omron Corporation, Kyoto, Japan

[21] Appl. No.: 525,779

[22] Filed: May 21, 1990

[30] Foreign Application Priority Data

| May 19, 1989 | [JP] | Japan | 1-126221 |
| May 24, 1989 | [JP] | Japan | 1-130330 |
| Jun. 20, 1989 | [JP] | Japan | 1-157980 |
| Jul. 18, 1989 | [JP] | Japan | 1-185742 |
| Oct. 18, 1989 | [JP] | Japan | 1-272718 |

[51] Int. Cl.$^5$ .................................................. G06F 13/00
[52] U.S. Cl. ................................... 395/200; 395/3; 395/900
[58] Field of Search ............. 364/DIG. 1, DIG. 2; 395/61, 3, 200, 325, 900, 75, 76

[56] References Cited
U.S. PATENT DOCUMENTS 4,918,620   4/1990   Ulug .................................... 364/513

Primary Examiner—Robert L. Richardson
Attorney, Agent, or Firm—Dickstein, Shapiro & Morin

[57] ABSTRACT

A communication network system comprising a communication line network, a plurality of terminals connected to the communication line network, and a fuzzy control unit for allocating a right to access the communication network according to a fuzzy deduction process taking into account an operating condition of the system. This communication network system may consist of a local area network involving a polling process or a token passing process, a computer terminals systems, or a telephone exchange system. By using a fuzzy control process, an efficient utilization of available resources is made possible by taking into account operating conditions of the network as a whole, or each of the terminals.

7 Claims, 33 Drawing Sheets

FIG. 26

| fuzzy deduction rules |
|---|
| if (processing speed is low) and (processing level is high) and (priority level is low) then (priority level is lowered) |
| if (processing speed is high) and (processing level is low) and (priority level is high) then (priority level is lowered) |
| if (processing speed is somewhat low) and (processing level is low) and (priority level is high) then (priority level is not changed) |
| if (processing speed is low) and (processing level is somewhat high) and (priority level is medium) then (priority level is slightly raised) |
| if (processing speed is somewhat high) and (processing level is high) and (priority level is high) then (priority level is slightly lowered) |
| ----- |

FIG. 31

| operating speed \ operation start up preliminary time period | | PS | PM | PL |
|---|---|---|---|---|
| | ×2 / ×1 | | | |
| P S | | y PM | PL | PL |
| P M | | PS | PL | PL |
| P L | | PS | PM | PL |

FIG. 36

| variation value \ comparison value | NL | NS | ZR | PS | PL |
|---|---|---|---|---|---|
| N L | PL | PM | PS | ZO | NS |
| N S | PM | PS | ZO | NS | NM |
| Z R | PM | PS | ZO | NS | NM |
| P S | PM | PS | ZO | NS | NM |
| P L | PS | ZO | NS | NM | NL |

FIG. 41

| input \ input | response ratio | | | | | | |
|---|---|---|---|---|---|---|---|
| hunting ratio | NL | NM | NS | ZR | PS | PM | PL |
| NL | | | | | | | |
| NM | | | | | | | |
| NS | | | | | | | |
| ZR | | | | ZR | ZR | ZR | ZR |
| PS | | | | NS | PS | PM | PL |
| PM | | | | NM | ZR | PS | PM |
| PL | | | | NL | NM | NS | ZR |

COMMUNICATION NETWORK SYSTEM USING A FUZZY CONTROL PROCESS

TECHNICAL FIELD

The present invention relates to a communication network system, and in particular to a communication network system using a fuzzy control process for its efficient operation.

BACKGROUND OF THE INVENTION

In the conventional local area network system based on a polling/selecting system, the master station carries out a polling on each of the slave stations at all times. Therefore, as the number of the slave stations increased, the time required for the polling process increased in proportion, and it gave rise to the problem that the time required for polling each slave station may be so long that a sufficient polling service to operating slave stations would become impossible, and the overall responsiveness of the system would drop.

To resolve this problem, the present applicant previously proposed a "Polling Device for a Network" (Japanese patent application No. 63-123711). According to this proposal, however, a polling is done even on those stations which may be active but do not require data transmission to be carried out so often, as equally often as those slave stations carrying out frequent data transmission, and unnecessary polling was not sufficiently reduced. In other words, in view of a desire to achieve an efficient utilization of the system, there remains the problem that the unnecessary polling lowers the operating efficiency and impairs the responsiveness of the system.

According to the conventional network based on the token passing system, the token is passed to different data communication devices connected to the network in a sequential manner to avoid the conflict between the data communication devices.

Since the amount of data communication may differ from one data communication device to another, each device may have a different degree of demand for the token. However, according to the system which passes the token from one device to another in a sequential fashion, since the token is passed to all of the devices equally irrespective of the difference in the levels of demand for the token which may exist, those communication devices having a high level of demand for the token receive the token after too long a remission, and the resulting delay in communication time tends to reduce the overall responsiveness of the network.

In the conventional data processing system in which a CPU is connected to an interruption control unit, a DMA control unit and an I/O control unit, the priority levels of the processes carried out by these control units are fixed at the time of system start-up. However, if the priority levels of the processes carried out by different control units are fixed at the time of system start-up, the priority levels may not be optimum depending on the particular contents of the data during the operation of the system. When the priority levels are not optimum, the overall data processing efficiency of the system drops, and the throughput of the system is reduced.

In a computer system consisting of a computer and a plurality of terminals connected thereto, the computer may be operated from each of the terminals within the time period allocated to the particular terminal by the computer. However, according to the prior art, since the timing of allocating time to each of the terminals is uniform without taking into account the skill of the person operating each of the terminals, each of the terminals was not necessarily efficiently utilized, and the efficiency of the overall system was not quite satisfactory.

As hunting methods in an exchange system equipped with the function of a representative number call receiving capability, there is known the determined hunting system according to which a certain priority order of terminals or communication lines is registered in advance and the hunting is always carried out from the head of this priority order, and the distributed hunting system according to which the hunting is always started from the one following the last hunted communication line.

However, according to these conventional hunting systems, depending on the order of registration, it may often occur that non-responsive communication lines are hunted repeatedly and that some of the communication lines may be more hunted than the others even though they may have a same level of responsiveness, so that uneven hunting processes tend to be carried out, and efficient operation of the system is not achieved.

BRIEF SUMMARY OF THE INVENTION

A primary object of the present invention is to provide communication network system which can adapt itself to the operating condition thereof and optimize its operating efficiency through the use of a fuzzy deduction process.

A second object of the present invention is to provide a local area network system based on a polling/selecting system which can improve the responsiveness of the network by varying the cycle of polling for each slave station according to its need for data transmission and offering an optimized efficient polling service.

A third object of the present invention is to improve the responsiveness of a local area network based on the token passing system by dynamically controlling the recipient of the token passed from each device.

A fourth object of the present invention is to provide a local area network system involving a priority level optimization process which can optimize the priority levels according to the mode of data processing during the operation of the system.

A fifth object of the present invention is to provide a computer network system which allows the control of the waiting time period of a terminal in a computer system to be carried out in appropriate fashion and allows the computer system to be operated in a more efficient manner.

A sixth object of the present invention is to provide a communication network system, for instance a telephone exchange system, equipped with a hunting order control device which can carry out an efficient hunting process according to the operating conditions of the particular communication lines.

These and other objects of the present invention can be accomplished by providing a communication network system, comprising: a communication line network; a plurality of terminals connected to the communication line network; and a fuzzy control unit for allocating a right to access the communication network according to a fuzzy deduction process taking into account an operating condition of the system.

Thus, the communication network system can adapt itself to the operating condition thereof and optimize its operating efficiency through the use of a fuzzy deduction process, and permits an efficient utilization of available system resources.

According to a preferred embodiment of the present invention, the terminals comprise a master station and a plurality of slave stations, the master station comprising: means for performing a polling on each of the slave stations according to a prescribed polling cycle, and acknowledging an operating condition each of the slave stations according to a response therefrom; means for temporarily storing a name of the acknowledged active station; means for assigning only those slave stations acknowledged to be active as objects of the polling by referring to the memory means during an inactive period of the acknowledgement means; means for collecting data on an operating condition of each of the active slave stations, and temporarily storing the data; means for determining a polling cycle corresponding to a data transmission requirement of each of the slave stations by means of a fuzzy deduction using membership functions based on an operating condition of each of the active slave stations stored in the temporary memory means; and means for executing the polling according to the polling cycle determined for each of the slave stations.

According to this embodiment, since the interval of polling is varied depending on the operating condition of each of the slave stations, polling of those station which may be active but not utilized or, in other words, which do not require data transmission is reduced in frequency as well as those stations involving relatively smaller amounts of data transmission.

As a result, even when there are a large number of slave stations which are not frequently utilized, it is possible to prevent the overall data transmission efficiency of the network to be lowered. In particular, by using a fuzzy deduction for determining the polling cycle, it becomes possible to dynamically determine an optimum polling cycle for the particular network structure, and optimum operation of the network. Improvement and maintenance of system responsiveness can also be accomplished in an automatic fashion. Thus, this embodiment can improve the efficiency of a polling operation in a local area network system based on a polling/selecting system by setting the polling cycle from a master station to each slave station to an optimum value for the given operating condition of the slave station.

According to another embodiment of the present invention, priority of data communication for each of the terminals is controlled by passing a token from one terminal to another, each of the terminals comprising: means for exchanging operating condition data to others of the terminals at certain timing; and means for determining an order of passing the token from those terminals having a relatively higher demand for the token to those having a relatively lower demand for the token.

A local area network system based on this embodiment determines the order of passing the token according to the operating condition of each of the devices. This determination process may be carried out either individually by each of the devices connected to the network or by a control station which passes its decision to each of the devices. It is assumed that this determination process is carried out by each of the devices in the following description, but a same result can be achieved by carrying out this process separately by using arithmetic computing means having repeatability. By determining the order of passing the token according to the operating condition, the delay in data communication due to the passing of the token to the devices having no demand for data communication can be avoided. As a result, even when there is a large number of devices having a low utilization ratio, the overall data communication efficiency of the local area network is not reduced.

This embodiment thus improves data communication efficiency and responsiveness in a local area network based on the token passing system by determining the order of passing the token from one data communication device to another in an optimum fashion through a fuzzy deduction process taking into account the operating condition of each of the data communication devices.

In particular, by using a fuzzy deduction process it is made possible to dynamically determine an optimum order of token passing which is adapted to the particular structure of the system so that the optimum operation of the network and maintenance of optimum responsiveness can be maintained in an automatic fashion.

According to yet another preferred embodiment of the present invention the terminals consist of a CPU, an interruption control unit, a DMA control unit, and an I/O channel control unit, wherein: data processing speeds of various tasks of the CPU are actually measured, and the measured values are each compared with a target value so that priority levels of the control units may be changed and optimized by a fuzzy deduction process using differences between the actually measured values and the target values as input information.

According to this embodiment, the target value of the processing speed is set up for each task, and the target value is compared with the actual speed of data processing for this task. The priority levels of the various control units are modified according to the result of such comparison processes so that an improvement in the data processing efficiency during the execution of the tasks may be achieved next time. By thus continually changing the priority levels during the operation of the system, it is possible to achieve an improvement in the efficiency of the data processing of the system as a whole.

According to yet another embodiment of the present invention, one of the terminals consists of a computer equipped with the fuzzy control unit, and the computer comprises: first determining means for detecting an operating speed of one of the terminals; and second detecting means for determining an operation start up preliminary time period extending from a time point at which operation of the terminal is allowed to a time point at which operation of the terminal is actually started; the fuzzy controller carrying out a fuzzy control on a waiting time period extending from a completion of operation of the terminal to a time point at which a next operation is allocated according to fuzzy rules and membership functions allocated with different fuzzy labels based on condition variables relating to an operating speed and an operation start up preliminary time period obtained from input signals supplied by the first and second detecting means.

According to such a structure, the waiting time of the terminal is controlled according to the operating speed and the operation start up preliminary time period of the terminal.

According to yet another embodiment of the present invention, the communication network consists of a telephone exchange system having a representative number call receiving capability, and one of the terminals is selected by a hunting process for receiving an incoming call whenever such a call is made to a representative number; the fuzzy control unit comprising: means for storing a hunting order of the terminals; means for storing a frequency of hunting processes and a frequency of response calls for each of the terminals; means for computing a ratio of the frequency of hunting processes for each of the terminals to the overall frequency of hunting processes for the entire system; means for computing a response call ratio during the hunting processes for each of the terminals; means for determining an order of carrying out each of the hunting processes on the terminals so as to optimize an operating efficiency of the system according to the computed hunting ratio and response call ratio for each of the terminals through a fuzzy deduction process making use of membership functions; and means for changing the hunting order stored in the hunting order storage means according to the determined hunting order for each of the terminals.

According to this embodiment of the present invention, since an optimum hunting order is determined so as to optimize the operating efficiency of the system according to the hunting ratio and the reception call ratio for each communication line by taking into account the responsiveness of each communication line when it is hunted, through a fuzzy deduction process, the following effects are achieved:

(1) Those communication lines which are not likely to be responsive are not frequently hunted, and the operating efficiency of the system can be improved.

(2) There is no need to predetermine the hunting order of the communication lines in advance.

(3) Those communication lines having a same level of responsiveness are subjected to even hunting, and there is no concentration of hunting on any particular communication lines.

(4) In determining the communication lines that are to be hunted, the process is much simplified because the continually updated hunting order is simply searched, and the head of the hunting order is selected sequentially.

BRIEF DESCRIPTION OF THE DRAWINGS

Now the present invention is described in the following with reference to the appended drawings, in which:

FIG. 26 shows fuzzy rules in the form of if-then statements;

FIG. 31 is a correspondence reference table of the fuzzy rules stored in the fuzzy controller given in FIG. 30;

FIG. 36 is a correspondence reference table of the fuzzy rules stored in the fuzzy controller given in FIG. 35;

FIG. 41 is a diagram showing other examples of fuzzy rules;

DETAILED DESCRIPTION OF THE PREFERRED EMBODIMENTS

Figure 1:
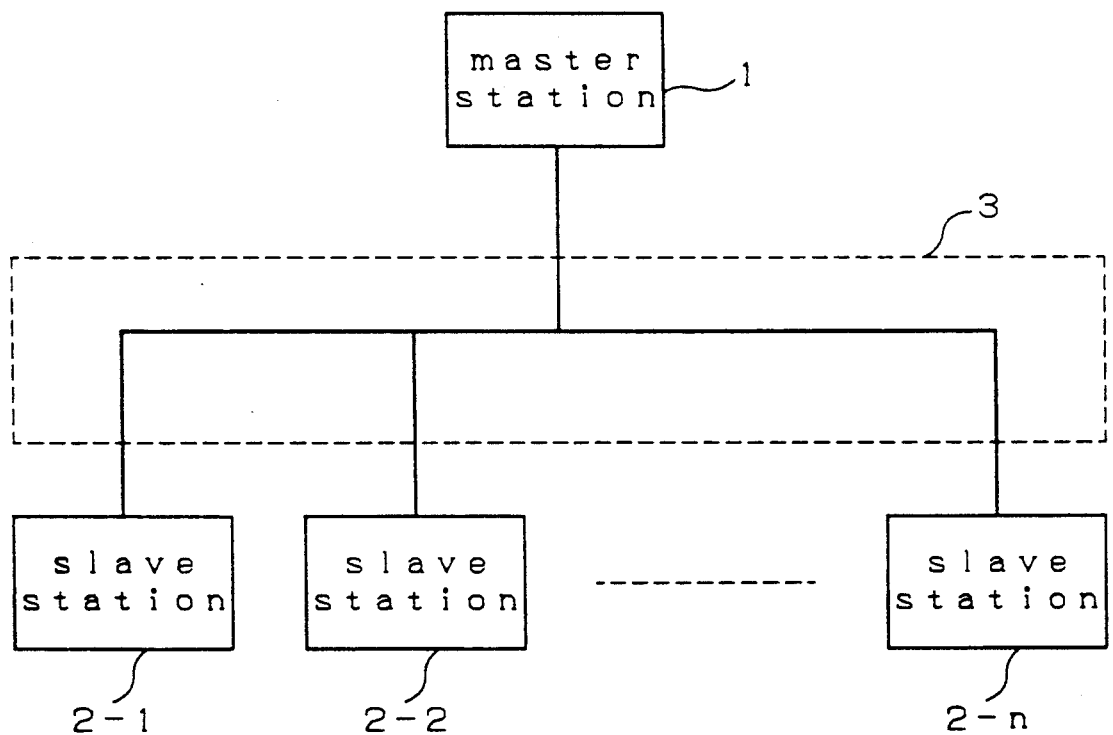
FIG. 1 is a block diagram of a local area network system to which a first embodiment of the present invention is applied.

FIG. 1 is a drawing depicting the overall structure of a first embodiment of the network system according to the present invention. Referring to FIG. 1, a master station 1 and slave stations 2-1 through 2-n are connected to each other by communication lines 3, and jointly form a communication network system. The master station 1 is internally incorporated with a polling device for providing a polling service to each of the slave stations 2-1 through 2-n, and soliciting data transmission from the polled slave stations.

Figure 2:
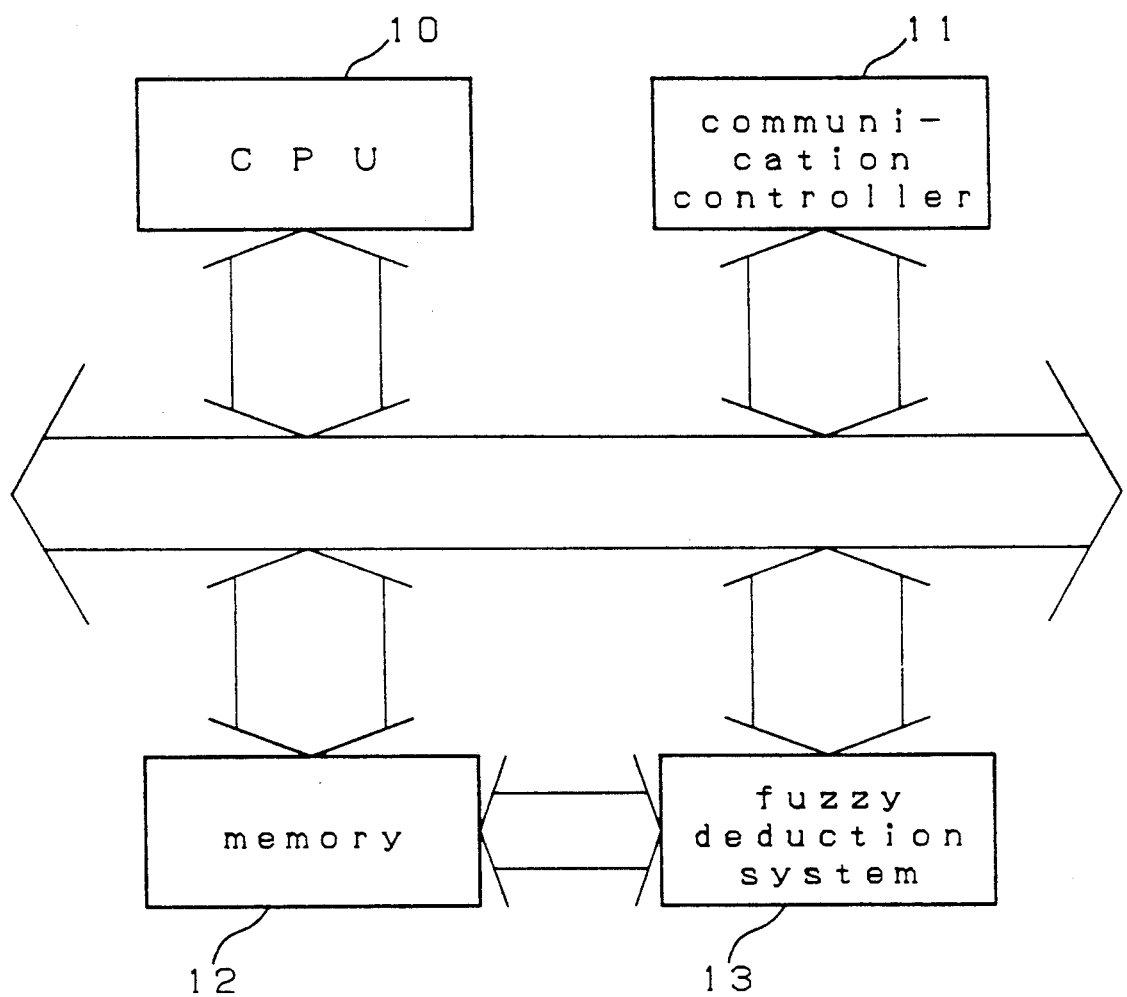
FIG. 2 is a block diagram showing the internal structure of the master station.

FIG. 2 is a block diagram depicting the internal structure of the master station 1. The master station 1 comprises a CPU 10, a transmission controller 11, a memory 12, a fuzzy deduction system 13, etc.. The CPU 10 controls the transmission controller 11 by executing a program stored in the memory 12. The fuzzy deduction system 13 continually carries out a deduction process without synchronizing with the CPU 10.

Figure 3:
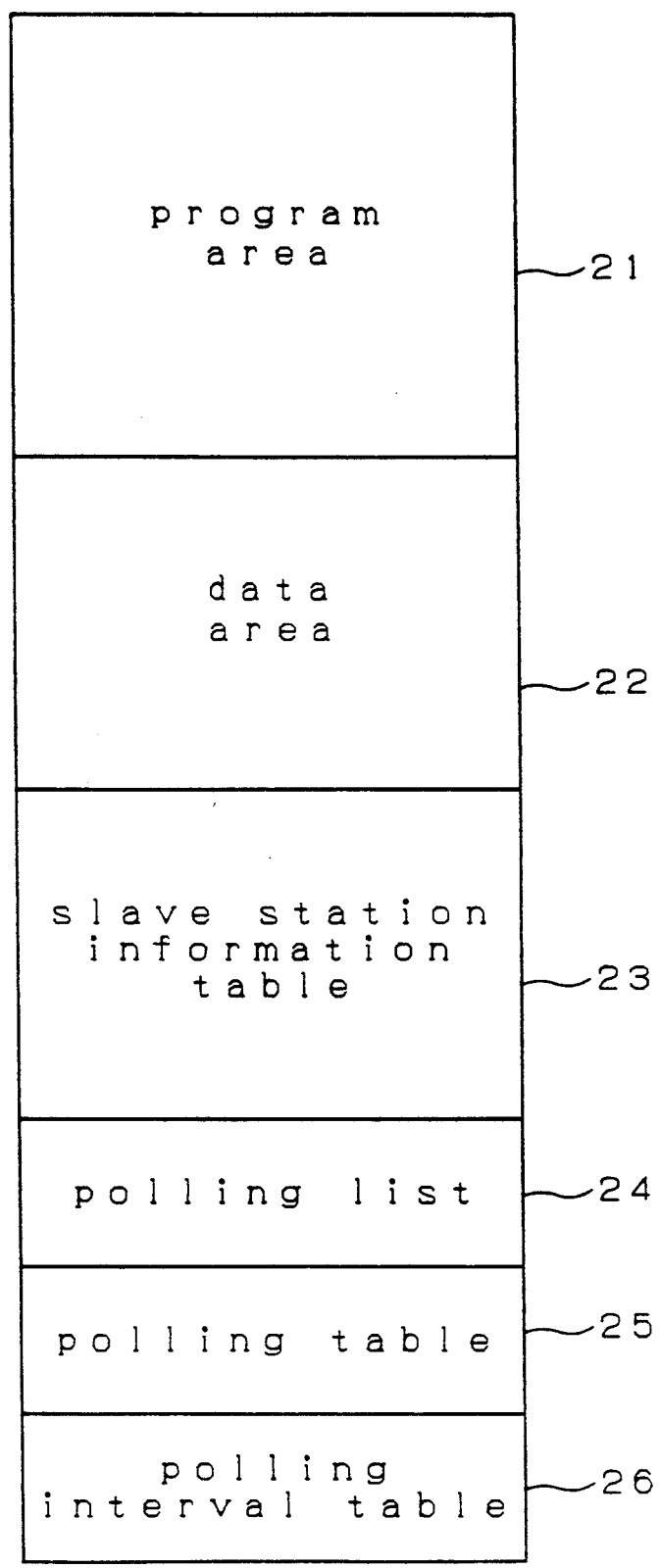
FIG. 3 is a memory map of the memory provided in the master station.

FIG. 3 is a diagram showing the internal structure of the memory 12. The memory 12 stores a control program for the master station 1 in its program area 21, various pieces of data related to data transmission in its data area 22, data related to the operating condition of each of the slave stations 2-1 through 2-n in its slave station information table 23, addresses of all the slave stations 2-1 through 2-n which are connected to the network and are subjected to polling in its polling list 24, addresses of the slave stations which responded to polling in its polling table 25, and a polling interval value of each of the slave stations in its polling interval table 26.

Now the operation of the polling control function of the master station 1 is described in the following. Immediately after the start up of the system, the master station 1 carries out polling on each of the slave stations 2-1 through 2-n registered in the polling list 24 in the ascending order of their addresses. At the same time, the master station 1 keeps monitoring the response of each of the slave stations to the polling, and registers those slave stations responding to the polling or, in order words, those slave stations which are determined to be active, in the polling table 25. The addresses of those slave stations which did not respond to the polling are deleted from the polling table 25.

Once polling on all the slave stations is completed, the addresses registered in the polling table 25 are limited only to those of the slave stations which are connected to the network in a normal way and are active. Thereafter, polling is carried out only on the slave stations whose addresses are registered in the polling table 25.

During the process of polling, a counter provided in the data area 22 for each of the slave stations is counted up for each cycle of polling, and polling is carried out on each particular slave station when the count stored in the data area 22 for this particular slave station matches up with the corresponding count value stored in the polling interval table 26. The count is reset to zero once the polling for this slave station is completed.

Figure 5:
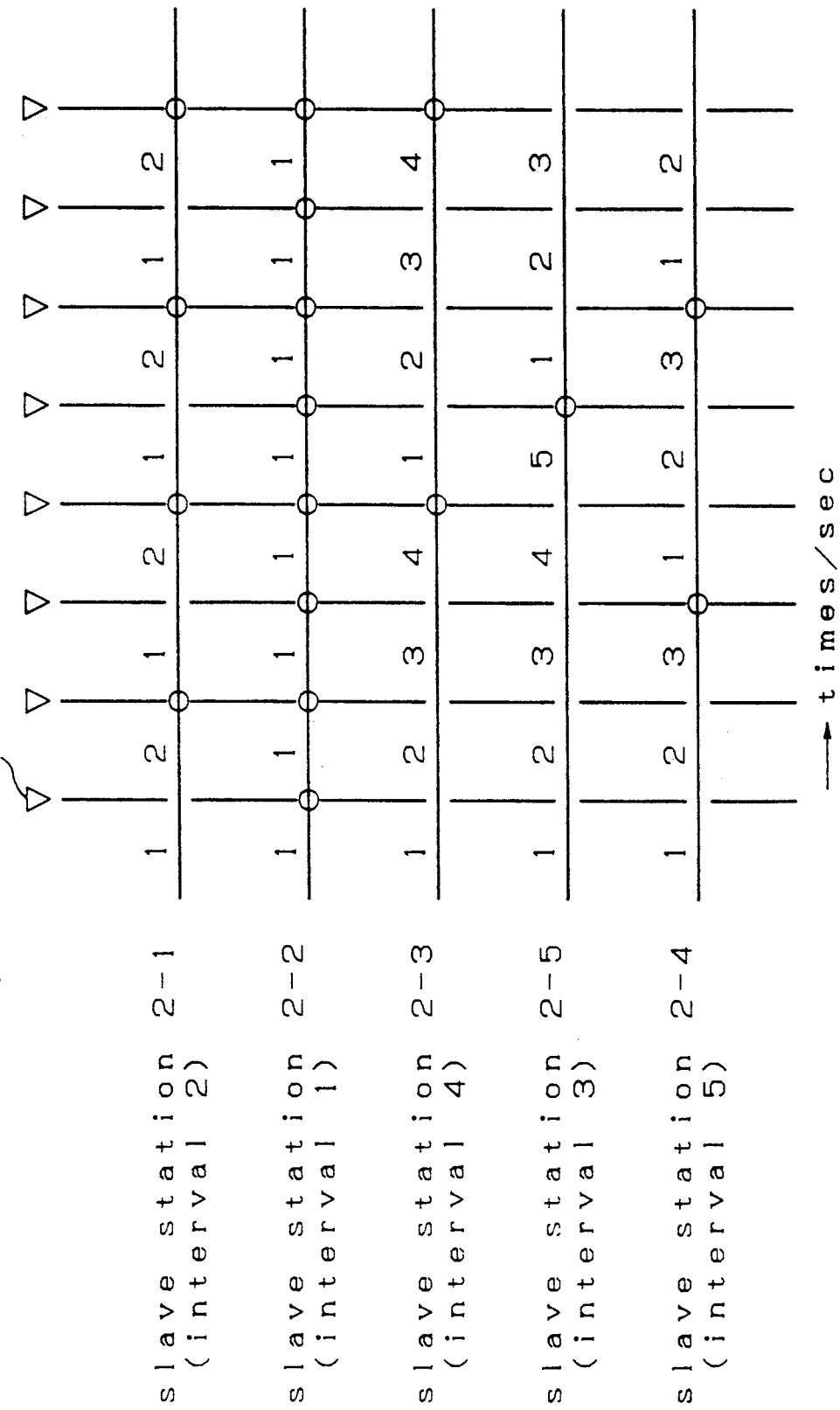
FIG. 5 is a time chart illustrating the mode of carrying out the polling process by the master station according to the first embodiment of the present invention.

FIG. 5 is a chart illustrating the intervals of polling on the salve stations 2-1 through 2-n. The numerals indicated on the time axis for each of the slave stations are the count values for each polling cycle. During the first cycle of polling, since the count value of the slave station 2-1 is 1 whereas its polling interval value is 2, no polling is carried out on the slave station 2a.

Likewise, no polling is carried out on the slave stations 2-3 through 2-5. Polling is carried out only on the slave station 2-2 because of the agreement between its count value and polling interval value. Execution of polling is indicated by the circles in this chart.

During the second cycle of polling, the count value of the slave station 2-1 becomes 2 and the count value of the slave station 2-2 becomes 1 so that polling is carried out on both the slave stations because of the agreement between their count values and polling interval values, respectively. However, no polling is carried out on the slave stations 2-3 through 2-5. The third and following cycles of polling are carried out in a similar fashion. In the polling process indicated in this chart, those slave stations having their interval values set to n are subjecting to a polling process once for every n cycles of polling.

Once the above described process is continued for a predetermined period of time, polling is again carried out on all the slave stations registered in the polling list 24 in the ascending order of their addresses, and the addresses registered in the polling table 25 to indicate the active slave stations are thus updated through monitoring of the responses from the slave stations.

Subsequently, the polling is resumed according to the updated polling table 25.

Figure 4:
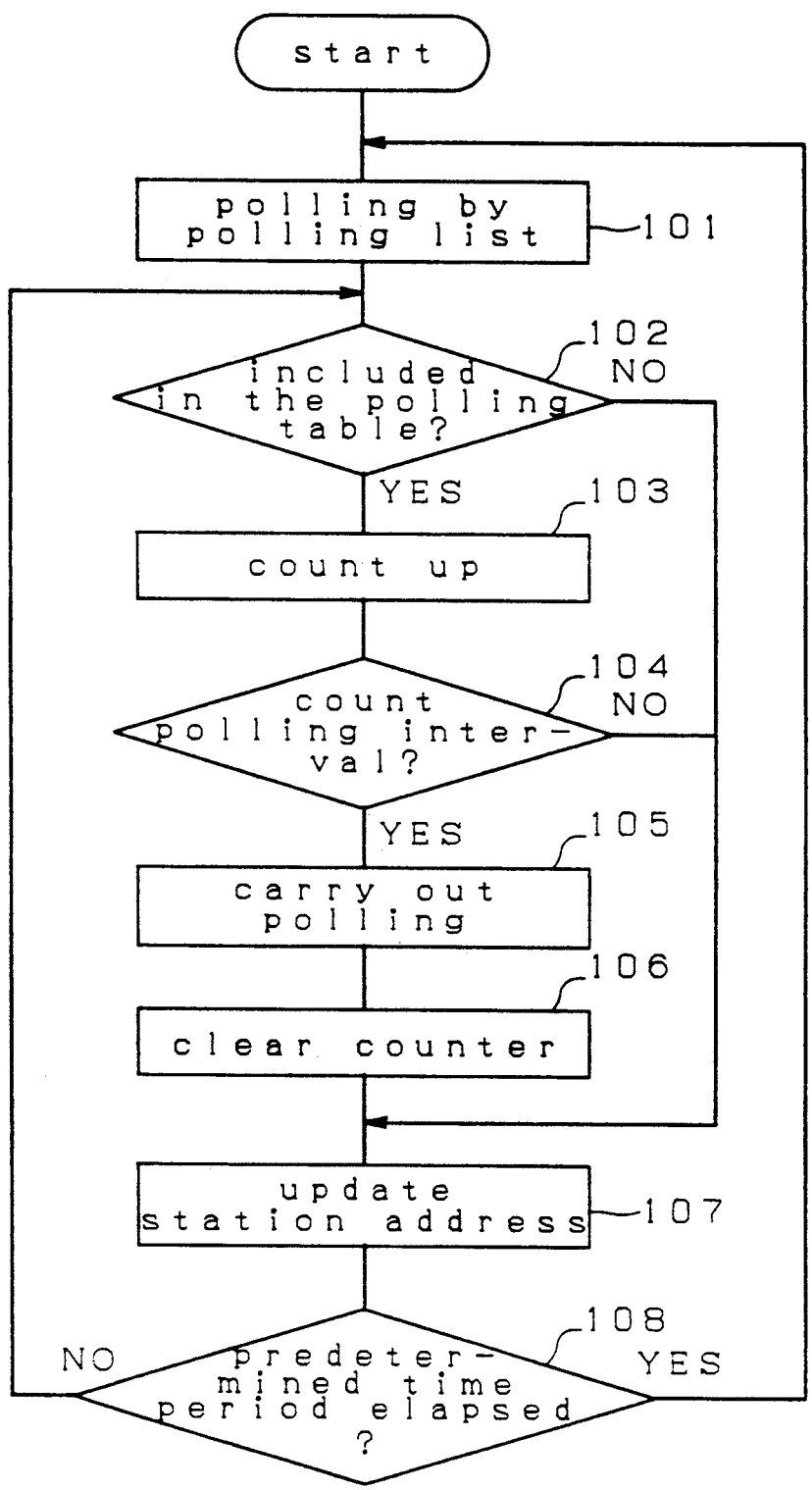
FIG. 4 is a flow chart describing the mode of operation of the master station.

FIG. 4 is a flow chart showing the process of the polling carried out by the master station 1. Now polling process carried out by the master station 1 is described in a step-by-step manner with reference to this flow chart.

Upon start up of the system, in the polling list 24 are registered the addresses of all the slave stations 2-1 through 2-n which are connected to the network and are subject to polling. Upon start up of the operation of the system, polling is carried out on each of the slave stations 2-1 through 2-5 according to the addresses registered in the polling list 24, and responses obtained from the slave stations are used to create a polling table 25 which contain the addresses of all the active slave stations (step 101). Thereafter, the polling is based on the polling table 25.

First of all, an arbitrary address is selected as that of a station to be polled, and it is determined if this address is registered in the polling table 25 or not (step 102). If it is not registered, no polling is carried out on this particular slave station, and the potential object for polling is shifted to the next address, (step 107).

If the address in question is registered in the polling table 25 at step 102, the counter corresponding to this slave station is counted up (step 103), and its count value is compared with a predetermined polling interval value stored in the polling interval table 26 (step 104). When the count value is less or more than the polling interval value, no polling is carried out on this particular slave station, and the potential object of polling is shifted to the next address (step 107). When the count value is equal to the polling interval value, polling is carried out on this slave station (step 105), and the count value is reset to zero (step 106).

When this process is carried out on these slave stations, the address of the slave station to be polled is further shifted to the next one by referring to the polling table 25 (step 107). Then, the poling process time is evaluated, and, if it is found that a predetermined time has elapsed (step 108 yes), the system flow returns to the first step 101 to resume the polling based on the polling list 24. When the predetermined time has not elapsed (step 108 no), the system flow advances to step 102 to carry out the polling process for the next slave station.

Since polling is thus carried out on all the slave stations by a certain fixed cycle to distinguish active slave stations from inactive stations, and polling is then confined only to the slave stations which are known to be active for a certain predetermined time interval, unnecessary polling on inactive slave stations is reduced, and the efficiency of the polling on the active slave stations is thereby improved.

As for those slave stations which became active during the above described process, they are newly registered in the polling table 25 by means of the polling on all the slave stations. Likewise, those slave stations which became inactive during the above described process are deleted from the polling table 25 by means of the polling on all the slave stations.

As for the polling on the active slave stations, the counter provided for each of the slave stations is counted up for each of the polling cycles, and the polling is actually carried out on this particular slave station only when the count agrees with a predetermined poling interval value. Thereby, the polling interval is properly adjusted according to the frequency of data transmission. Furthermore, unnecessary polling is avoided during the process of carrying out the polling on the active slave stations, and the overall efficiency of the polling process is even further improved.

The predetermined polling interval mentioned here is determined by the fuzzy deduction system 13 according to the information on the operating conditions collected from the slave stations via the transmission controller 11.

Now the operation of the fuzzy deduction system 13 is described below.

The information related to the operating conditions which is to be used as a basis for deduction is transmitted from each of the slave stations to the master station during the process of data transmission along with the data to be transmitted, and this information is set up in the slave station information table 23 of the memory 12 via the transmission controller 11 by the CPU 10. The collected information includes the frequency of data transmission (the number of requests to transmit data for a given unit time), the amount of data (the amount of data transmitted for a given unit time), and the elapsed time (the elapsed time from previous time point of data transmission).

The fuzzy deduction system 13 functions independently from the CPU 10, and receives information on the transmission frequency s1, the amount of data transmission s2, and the elapsed time s3 from the memory 12, and outputs a polling interval V as a result of a deduction process. The output V is set up in the polling interval table 26 of the memory 12 for each of the slave stations.

Figure 6:
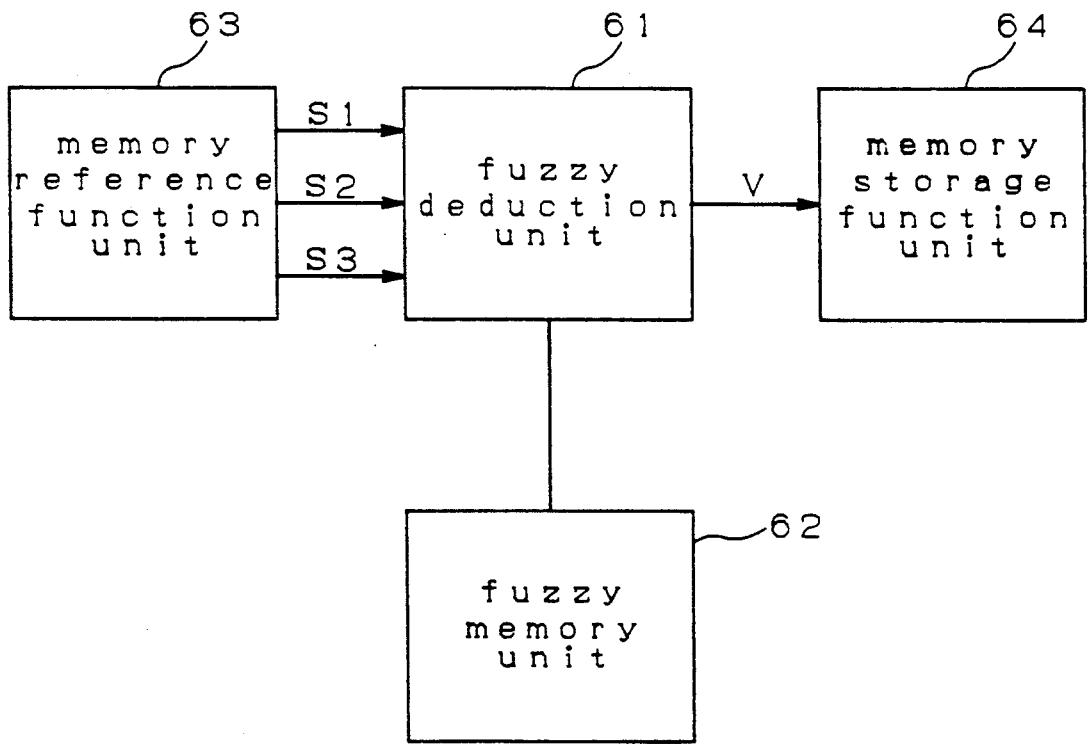
FIG. 6 is a block diagram showing the internal structure of the fuzzy deduction system.

FIG. 6 is a diagram depicting the internal structure of the fuzzy deduction system 13. The fuzzy deduction system 13 consists of a fuzzy deduction unit 61, a fuzzy memory 62, a memory reference function unit 63, and a memory storage function unit 64.

The memory reference function unit 63 converts the contents of the data in the memory 12 into a signal which can be supplied to the fuzzy deduction unit 61. The memory storage function unit 64 stores the output signal from the fuzzy deduction unit 61 in the memory 12.

The detection signals s1, s2 and s3 obtained by the memory reference function unit 63 are supplied to the fuzzy deduction unit 61.

The fuzzy deduction unit 61 is meant as a device in broad sense which can carry out fuzzy deduction and/or fuzzy arithmetic operation, and may consist of any combination of fuzzy computers, fuzzy controllers, fuzzy deduction devices, and other fuzzy deduction arithmetic operation units.

The devices used for fuzzy deduction may consist of either digital or analog devices, and may also consist of binary type computers and processors which are programmed so as to execute fuzzy deduction.

In any case, the fuzzy deduction unit 61 is preprogrammed with rules for adjusting the polling intervals, and these rules which are defined by membership functions are stored in the fuzzy memory 62.

FIGS. 7 through 10 show examples of the membership functions stored in the fuzzy memory 62.

Figure 7:
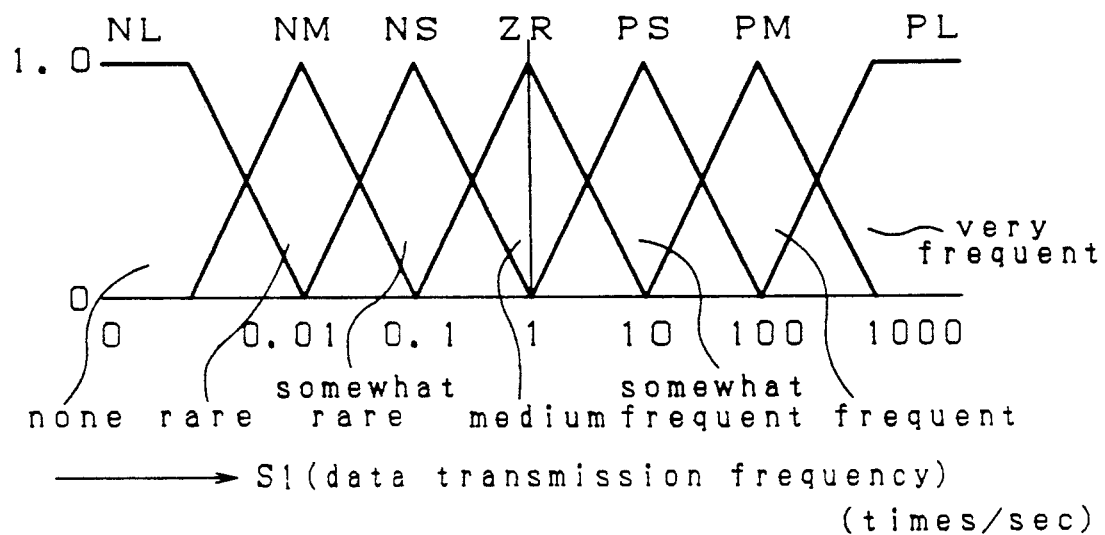
FIGS. 7 through 10 are graphs showing the membership functions which are stored in the fuzzy memory.

FIG. 7 shows membership functions which represent seven pieces of language information (fuzzy labels) consisting of "none", "rare", "somewhat rare", "medium", "somewhat frequent", "frequent", and "very frequent" in regard to the frequency of data transmission.

Figure 8:
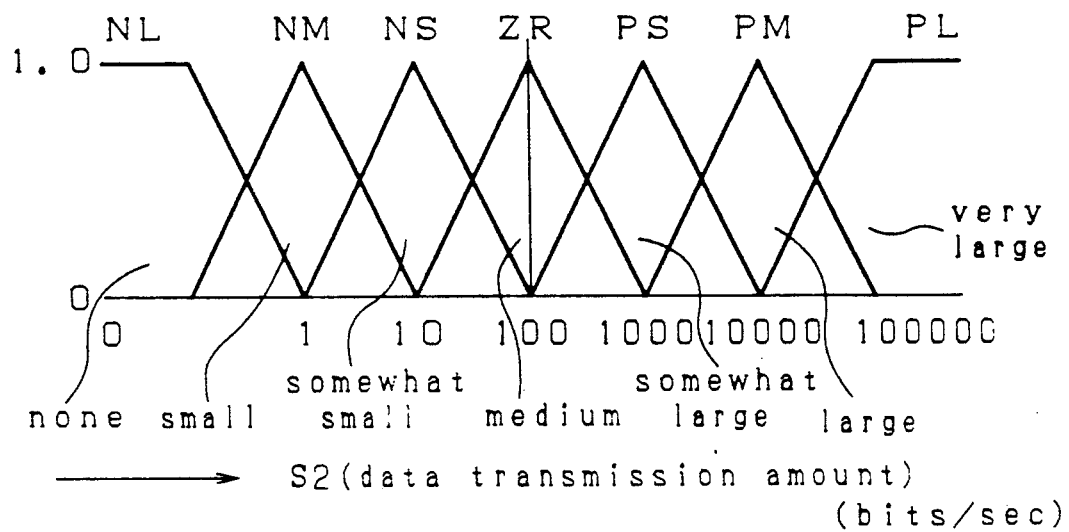

FIG. 8 shows membership functions which represent seven pieces of language information consisting of "none", "little", "somewhat little", "medium", "somewhat large", "large", and "very large" in regard to the amount of data transmission.

Figure 9:
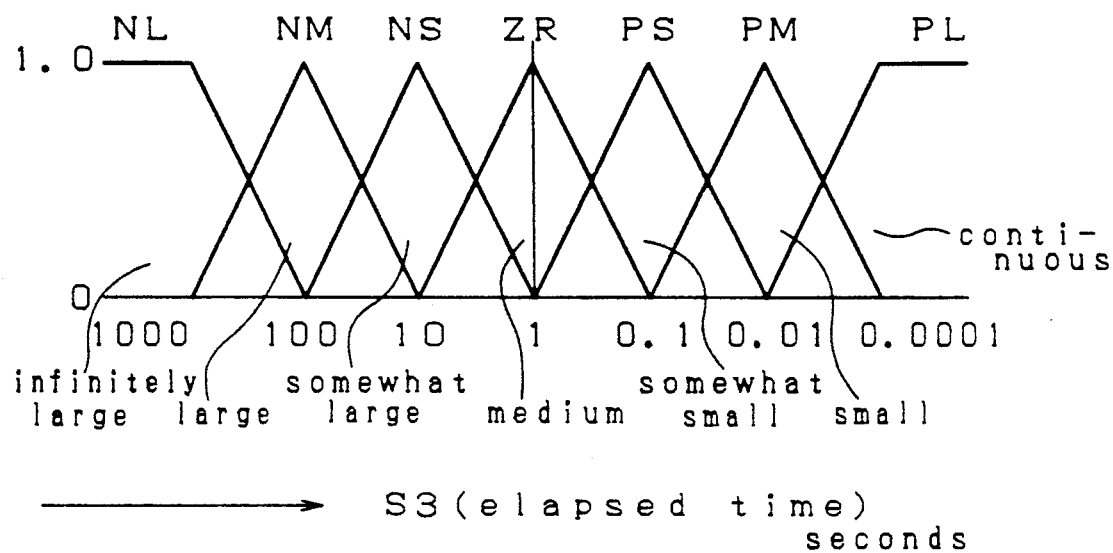

FIG. 9 shows membership functions which represent seven pieces of language information consisting of "infinitely large", "large", "somewhat large", "medium", "somewhat small", "small", and "continuous" in regard to the elapsed time.

Figure 10:
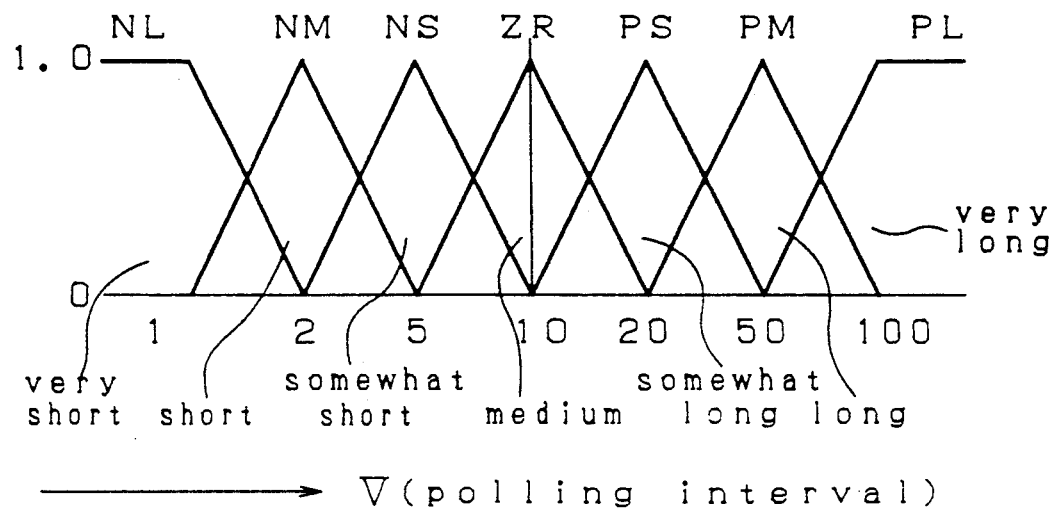

FIG. 10 shows membership functions which represent seven pieces of language information consisting of "very short", "short", "somewhat short", "medium", "somewhat long", "long", and "very long" in regard to the interval of polling.

These membership functions may assume various configurations such as triangular, trapezoidal, normal distribution and so forth, and the membership functions as well as the rules may be modified during the operation of the system as required.

The rules used in the fuzzy deduction unit 61 for deduction are generally called as if-then statements, and examples thereof are given in the following:

(1) If the frequency of data transmission is very frequent, the amount of data transmission is very large, and the elapsed time is long, then the polling interval is made short.

(2) If the frequency of data transmission is very frequent, the amount of data transmission is very large, and the elapsed time is short, then the polling interval is made very short.

(3) If the frequency of data transmission is none, the amount of data transmission is none, and the elapsed time is long, then the polling interval is made very long.

(4) If the frequency of data transmission is medium, the amount of data transmission is medium, and the elapsed time is long, then the polling interval is made somewhat short.

(5) If the frequency of data transmission is somewhat frequent, the amount of data transmission is somewhat large, and the elapsed time is long, then the polling interval is made short.

(6) If the frequency of data transmission is medium, the amount of data transmission is medium, and the elapsed time is short, then the polling interval is made somewhat long.

(7) If the frequency of data transmission is somewhat rare, the amount of data transmission is somewhat large, and the elapsed time is medium, then the polling interval is made long.

The fuzzy deduction arithmetic operation carried out by the fuzzy deduction unit 61 may consist of various different kinds, and the following describes one of such kinds which is based on the MIN-MAX arithmetic rule.

The degree to which each of the input signals s1, s2 and s3 belongs to the membership functions for the frequency of data transmission, the amount of data transmission and the elapsed time, respectively, or, in other words, the function value of each of the membership functions for each of the given input signals s1, s2 and s3 is evaluated. Three membership functions having smallest levels of membership are then selected for each of the rules (MIN arithmetic operation), and the membership functions related to the polling interval are bisected according to these selected levels of membership (as a sort of MIN arithmetic operation to find the portions corresponding to the degrees of non-membership). The membership functions related to the polling interval thus obtained are superimposed one over the other over the entire set of rules (MAX arithmetic operation), and the final polling interval command (analog voltage) V is obtained through a de-fuzzifying process which, for instance, may consist of finding their gravitational centers.

The polling interval command V is given to the memory storage function unit 64, and is set up in the polling interval table 26 in the memory 12 as a polling interval value.

Figure 11:
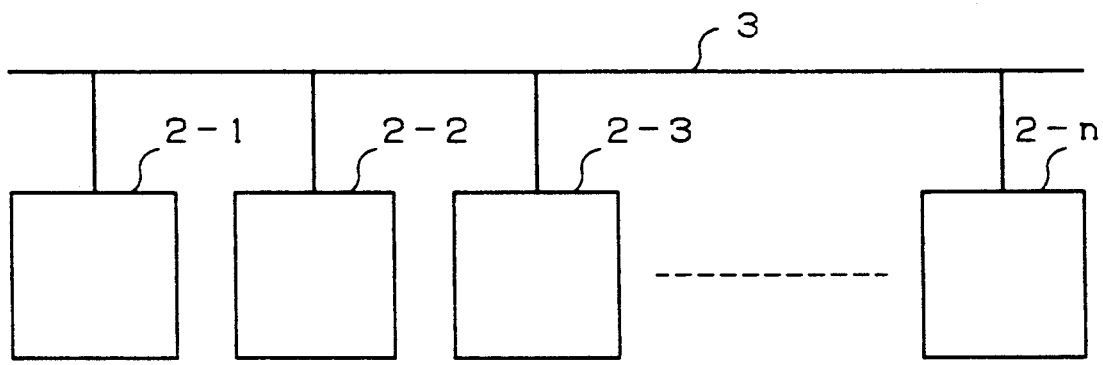
FIG. 11 is a block diagram of a local area network system to which a second embodiment of the present invention is applied.
Figure 12:
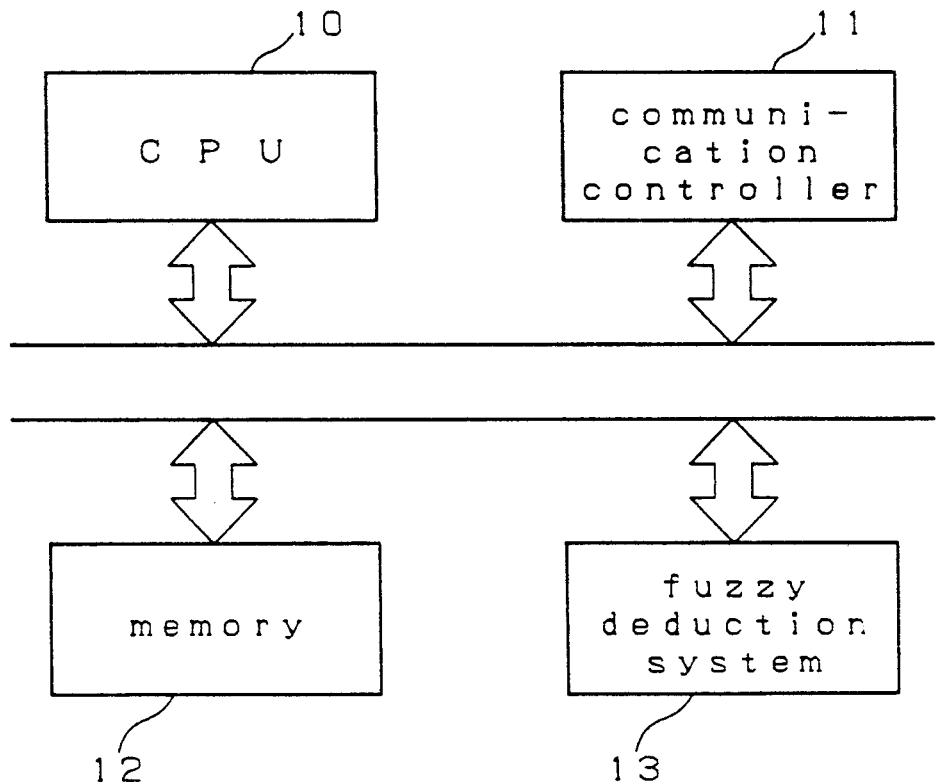
FIG. 12 is a block diagram showing the internal structure of one of the terminals connected to this local area network system.

FIG. 11 is a block diagram showing the structure of a local area network system given here as a second embodiment of the present invention, and FIG. 12 is a block diagram of each of the data communication terminals. n number of data communication terminals 2-1 through 2-n are connected to each other by way of a communication line 3 so as to form a network as a whole. Each of the data communication terminals is assigned with a number (network address) without any redundancy. This local area network is based on the so-called token passing system in which the data communication terminal which has received the token (right to transmit data) transmits data, and passes the token (token passing) to the next terminal upon completion of data communication.

In particular, in the local area network of this embodiment, the order of passing the token from a terminal which has finished data communication to the next data communication terminal is determined according to a result of a fuzzy deduction process which takes into account the operating condition of each of the communication terminals. The system is normally operated in a data communication mode which is interrupted by a monitor mode which lasts a few millisecond seconds for each second. In this monitor mode, not only the network address is acknowledged but information on the operating condition of each of the data communication terminals is exchanged. The obtained information is stored in an information table 34 (which is described hereinafter) of each of the terminals. The collected data here includes the frequency of data communication (the number of demands for data communication during a given period of time), the data communication amount (the amount of data transmitted during a given period of time), and the elapsed time (the elapsed time period from the previous data communication). These pieces of data are used as the input variables for the above mentioned fuzzy deduction process.

Each of the data communication terminals consists of a CPU 10, a communication controller 11, memory 12, and a fuzzy deduction system 13. The CPU 10 controls the communication controller 11 according to a program stored in the memory 12. The fuzzy deduction system 13 continually carries out a fuzzy deduction process without synchronizing with the CPU 10.

Figure 13:
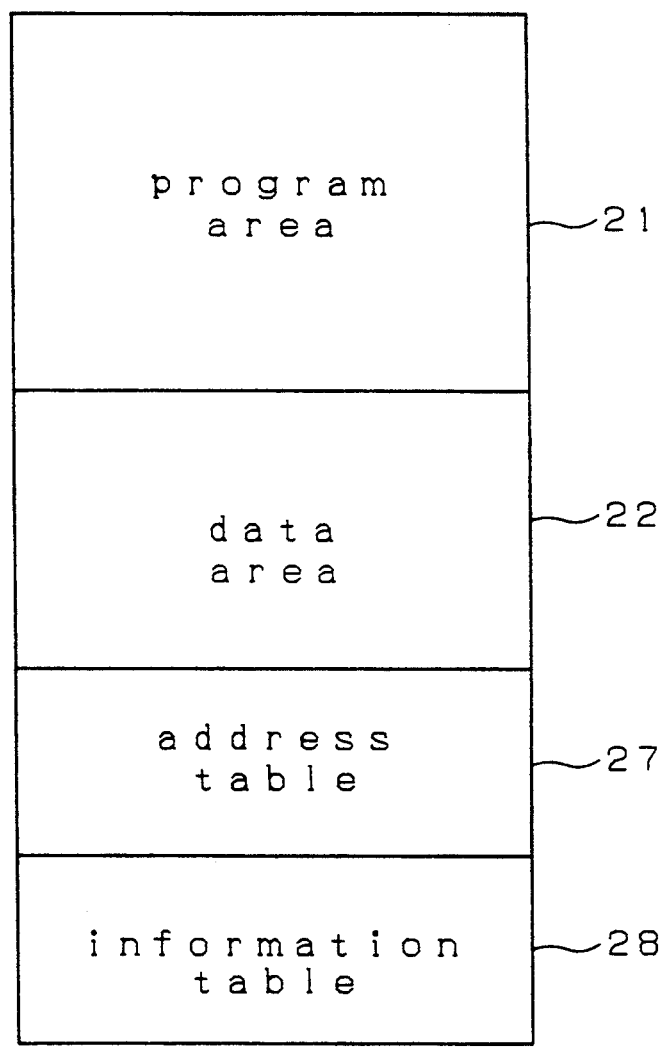
FIG. 13 is a memory map of the memory provided in the terminal.

FIG. 13 is a diagram showing the internal structure of the memory 12 which comprises a program area 21, a data area 22, an address table 27, and an information table 28. The program area 21 stores the control program for the data communication terminal. The data area 22 stores various pieces of data related to data communication. The address table 27 stores the network addresses of all the data communication terminals connected to the network, and the information table 28 stores the data on the operating conditions of these data transmission terminals.

Figure 14:
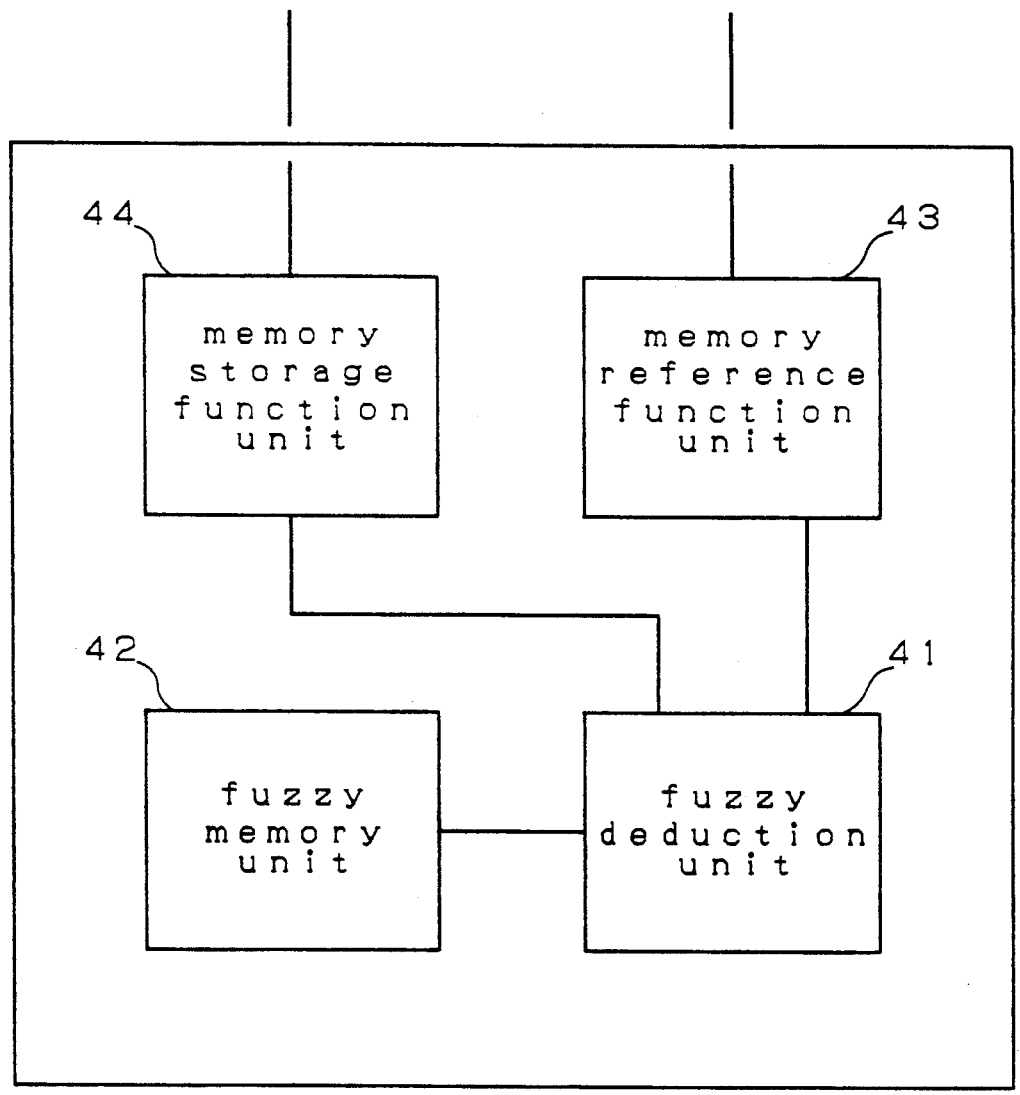
FIG. 14 is a block diagram showing the internal structure of the fuzzy deduction system.

FIG. 14 shows the internal structure of the fuzzy deduction system, and its fuzzy deduction unit 41 is provided with the function of deducing the priority level (the level of demand) when passing the token to another station. The fuzzy deduction system 13 functions independently from the CPU 10, and deduces and outputs a level of demand V according to the communication frequency S1, the amount of data communication S2 and the elapsed time s3 at each of the communication terminal which are received as its inputs from the memory 12. The produced level of demand is set up in the address table 27 of the memory 12. This fuzzy deduction system 13 comprises, in addition to the fuzzy deduction unit 41, a fuzzy memory unit 42, a memory reference function unit 43, and a memory storage function unit 44. The memory reference function unit 43 reads data related to the operating condition of each of the data communication terminals from the memory 12, and converts it into the signals S1, S2 and S3 which can be supplied to the fuzzy deduction unit 41. This fuzzy deduction unit 41 is an arithmetic operation unit which is capable of executing a fuzzy deduction process and a fuzzy arithmetic operation. The fuzzy deduction unit 41 may consist of any device which is capable of carrying out a fuzzy arithmetic operation, and may consist of a fuzzy computer, a fuzzy controller, a fuzzy deduction terminal, a fuzzy deduction arithmetic operation unit, a dedicated terminal (either analog or digital), or a binary computer or a processor programmed to carry out a fuzzy deduction process. The fuzzy deduction unit 41 is preprogrammed with rules for adjusting the demands for the token. The fuzzy memory unit 42 stores membership functions which are used in connection with these rules (refer to FIGS. 15 through 18). The memory storage unit 44 has the function to store the level of demand given as an output signal from the fuzzy deduction unit 41 in the memory 12 (the address table 27).

Figure 15:
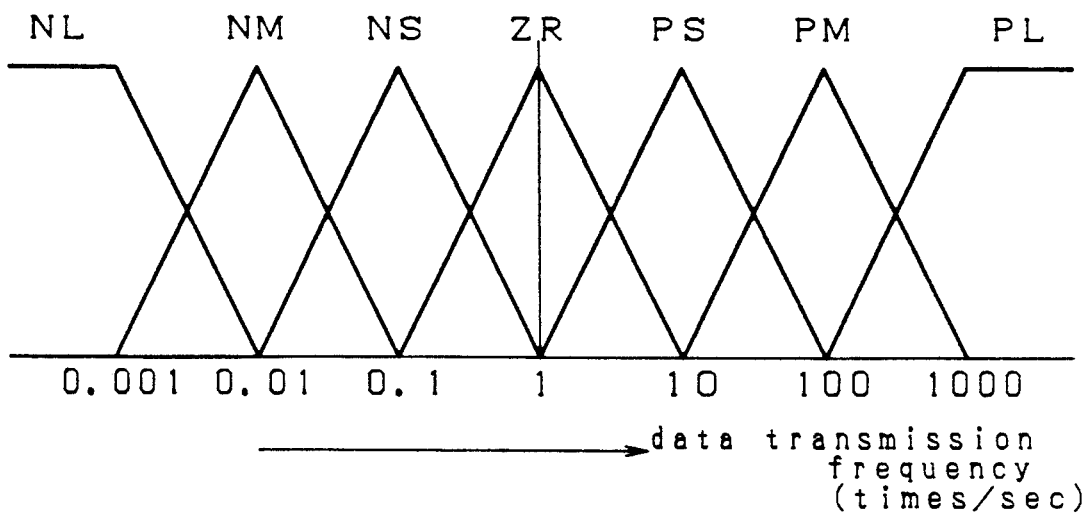
FIGS. 15 through 18 are graphs showing the membership functions which are stored in the fuzzy memory.
Figure 16:
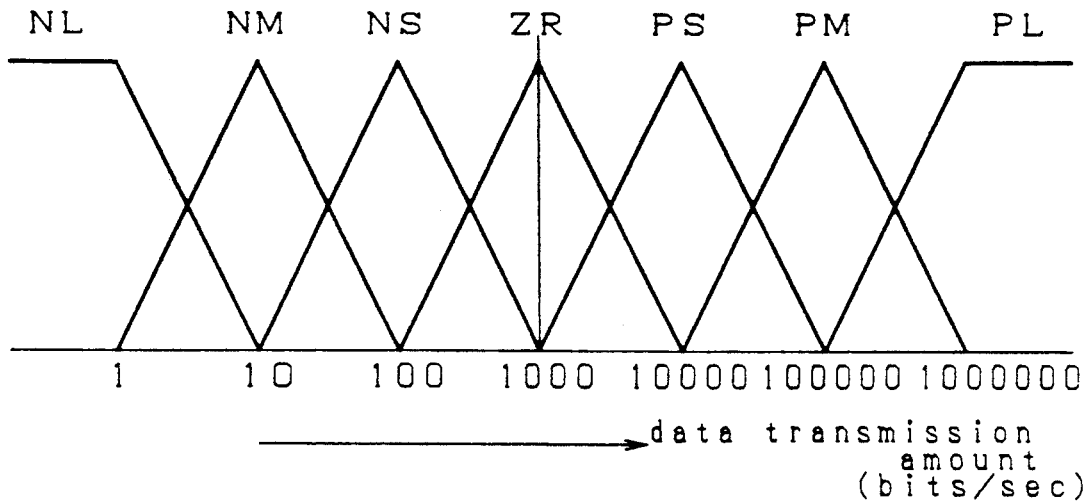
Figure 17:
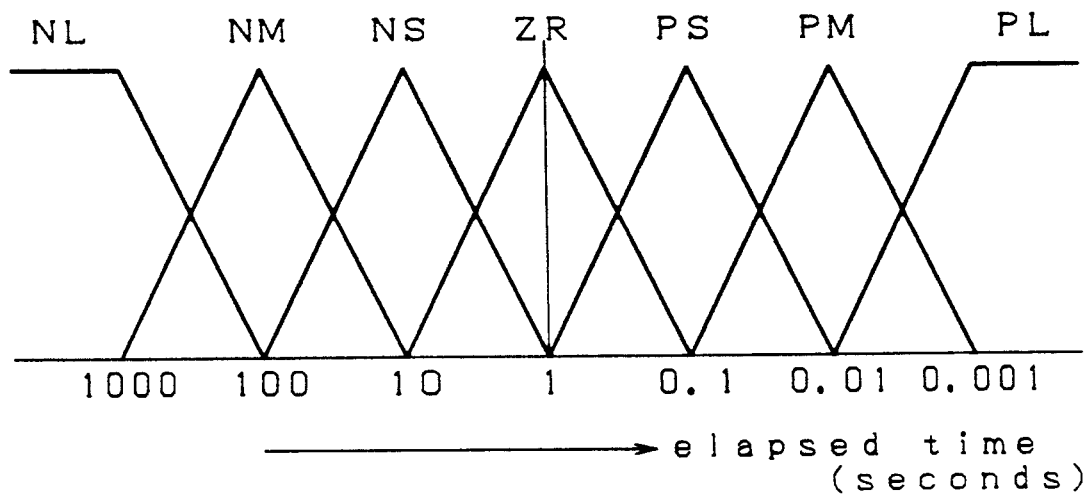
Figure 18:
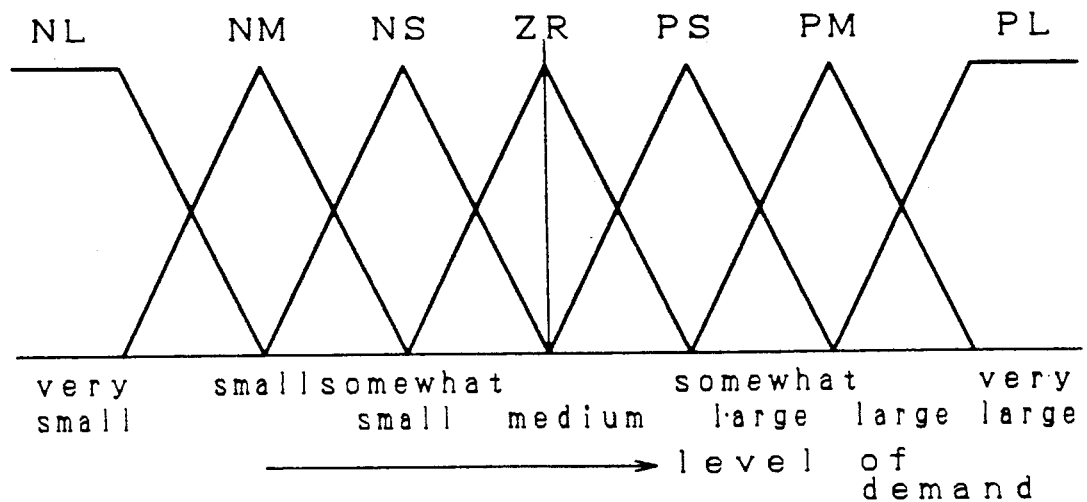

FIGS. 15 through 18 show examples of the membership functions used for this fuzzy deduction process. FIG. 15 shows the membership functions which represent the seven items of information related to the communication frequency, "none", "rare", "somewhat rare", "medium", "somewhat frequent", "frequent", and "very frequent". FIG. 16 shows the membership functions which represent the seven items of information related to the communication amount, "none", "small", "somewhat small", "medium", "somewhat large", "large", and "very large". FIG. 17 shows the membership functions which represent the seven items of information related to the elapsed time, "infinitely large", "large", "somewhat large", "medium", "somewhat small", "small", and "continuous". FIG. 18 shows the membership functions which represent the seven items of information related to the level of demand represented by the result values, "very low", "low", "somewhat low", "medium", "somewhat high", "high", and "very high". These membership functions may be triangular, trapezoidal or normal distribution in shape. It goes without saying that these membership functions and the rules may be modified as required depending on the particular application.

The fuzzy deduction process by the fuzzy deduction unit 41 using the membership functions is carried out according to the rules which are called as if-then statements or rules. Typical examples of these rules are given in the following.

1—If the transmission frequency is "very frequent", the data communication amount is "very large", and the elapsed time is very "large", then the level of demand should be set "high".

2—If the transmission frequency is "very frequent", the data communication amount is "very large", and the elapsed time is "small", then the level of demand should be set "very high".

3—If the transmission frequency is "none", the data communication amount is "none", and the elapsed time is "very large", then the level of demand should be set "very low".

4—If the transmission frequency is "medium", the data communication amount is "medium", and the elapsed time is "large", then the level of demand should be set "somewhat high".

5—If the transmission frequency is "somewhat frequent", the data communication amount is "somewhat small", and the elapsed time is "large", then the level of demand should be set "high".

6—If the transmission frequency is "medium", the data communication amount is "medium", and the elapsed time is "small", then the level of demand should be set "somewhat low".

7—If the transmission frequency is "somewhat rare", the data communication amount is "somewhat large", and the elapsed time is "medium", then the level of demand should be set "low".

There are various methods for carrying out the deduction arithmetic operation with the fuzzy deduction unit, and the following is an example of the fuzzy deduction arithmetic operation based on the MIN-MAX arithmetic operation rule.

For each of the above mentioned rules, the degrees of membership of the input signals S1, S2 and S3 concerning the communication frequency, the communication amount and the elapsed time, respectively, to the corresponding membership functions (or the functions values when the signals S1, S2 and S3 are obtained (refer to FIGS. 15 through 17). Those involving the least degrees of membership are selected for each of the rules (MIN arithmetic operation), and the membership functions are sliced according to the levels of demand concerning this rule according to the thus selected degrees of membership (a kind of MIN arithmetic operation: complements of the degrees of membership are obtained.). The thus obtained membership functions concerning the levels of demand for the token are superimposed one over the other over the entire set of rules (MAX arithmetic operation), and the gravitational center is obtained so that the information may be de-fuzzified, and the final demand command (for instance analog voltage) V may be obtained (refer to FIG. 18).

The demand command V is supplied to the memory storage function unit 44 and is stored in the address table 27 of the memory 12 in the order of the levels of demand.

The order of passing the token is determined according to the levels of demand determined by the above described process. The levels of demand are dynamically changed according to the operating condition information obtained during the monitor mode, and the order of passing the token is changed accordingly. Thereby, the optimum order of passing the token can be automatically determined without affecting the operation of data communication.

Each of the data transmission terminals looks up the level of demand listed in the address table 27 when it is ready to pass the token, and passes the token to the address which has the highest level of demand. The levels of demand which are set up on the address table 33 are determined by the fuzzy deduction system 13 separately from and in parallel with the process of data communication.

Figure 19:
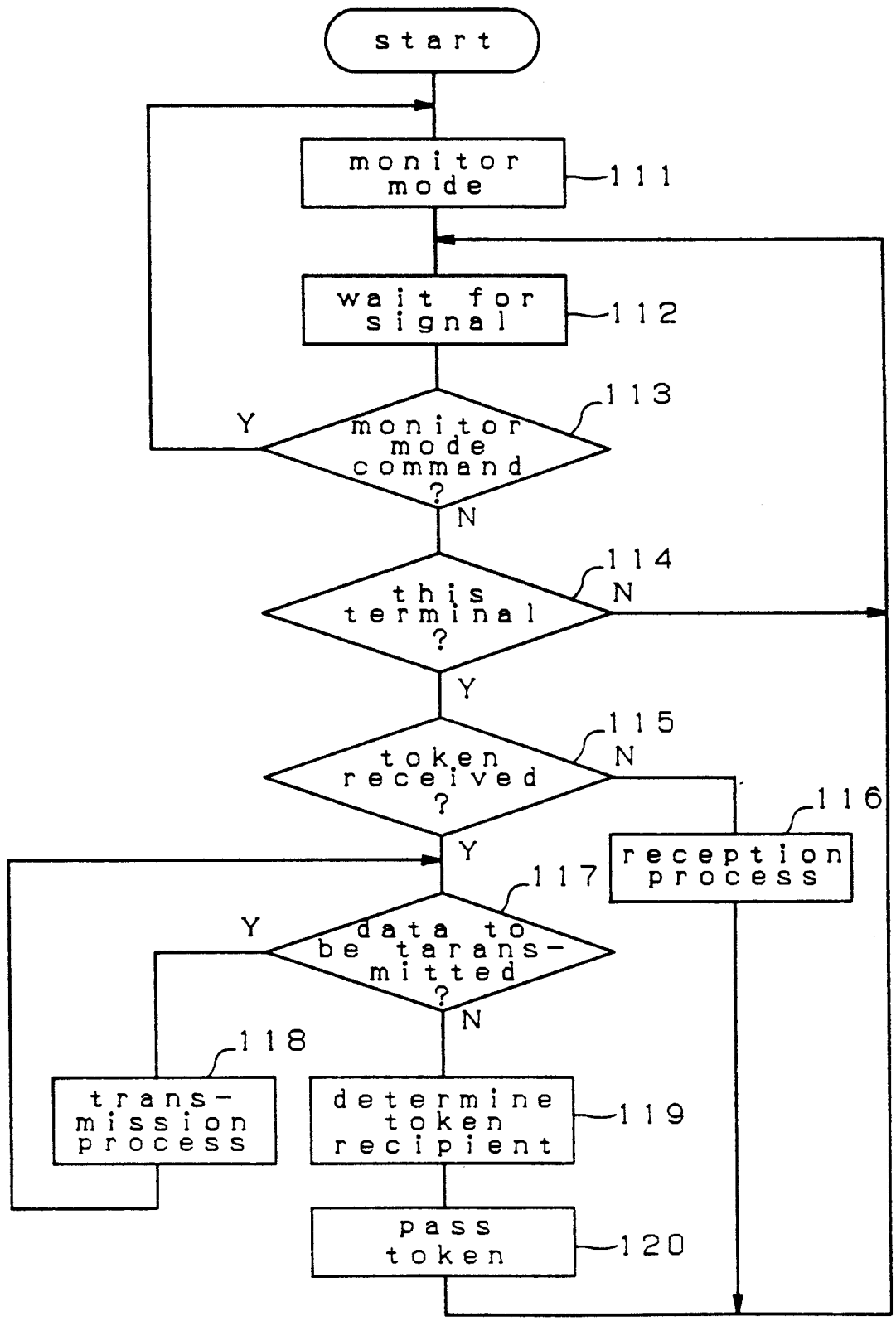
FIG. 19 is a flow chart describing the mode of operation of the CPU used in the terminal.

Now the operation of the token control in each of the data communication terminals is described in the following with reference to the flow chart of FIG. 19.

The monitor mode is automatically produced immediately after the start up of the system, and the network addresses of all the data communication terminals connected to the network are exchanged between the terminals and written into the address tables 27 of the data communication terminals (111). Thereafter, in each of the data communication terminals, the monitor mode is taken over by the data transmission mode, and reception of data is awaited (112). During this phase of awaiting data reception, the data communication terminal may receive a monitor mode command (113), data directed to this data communication terminal (113), or the token passed on to this data communication terminal (114). When this data communication terminal has received a message which does not belong to any of these categories, it simply disregards this message and continues the state of. awaiting a signal reception (112).

When a message consisting of a monitor mode command is received (This monitor mode command is simultaneously transmitted from a monitor station to all of the data communication terminals on this network, and the monitor mode is produced for a few milliseconds for every second.), the process of the monitor mode is carried out in the same way as upon the start up of the network. When a message directed to this data communication terminal is received, it is determined whether this message consists of transmitted data or the token (115). If the received message consists of transmitted data, a data reception process is carried out (116), and the received data is supplied to the network user. If the received message consists of the token, it is determined whether the terminal requires a data transmission (117), and a data transmission is carried out if there is any data to be transmitted (118). When transmission of all the data is completed, the next recipient of the token is determined by looking up the demand level data stored in the address table according to a fuzzy deduction process (119). When the token is passed to the next data communication terminal (120), the system flow returns to step 112 where the process of awaiting data transmission is carried out.

Figure 20:
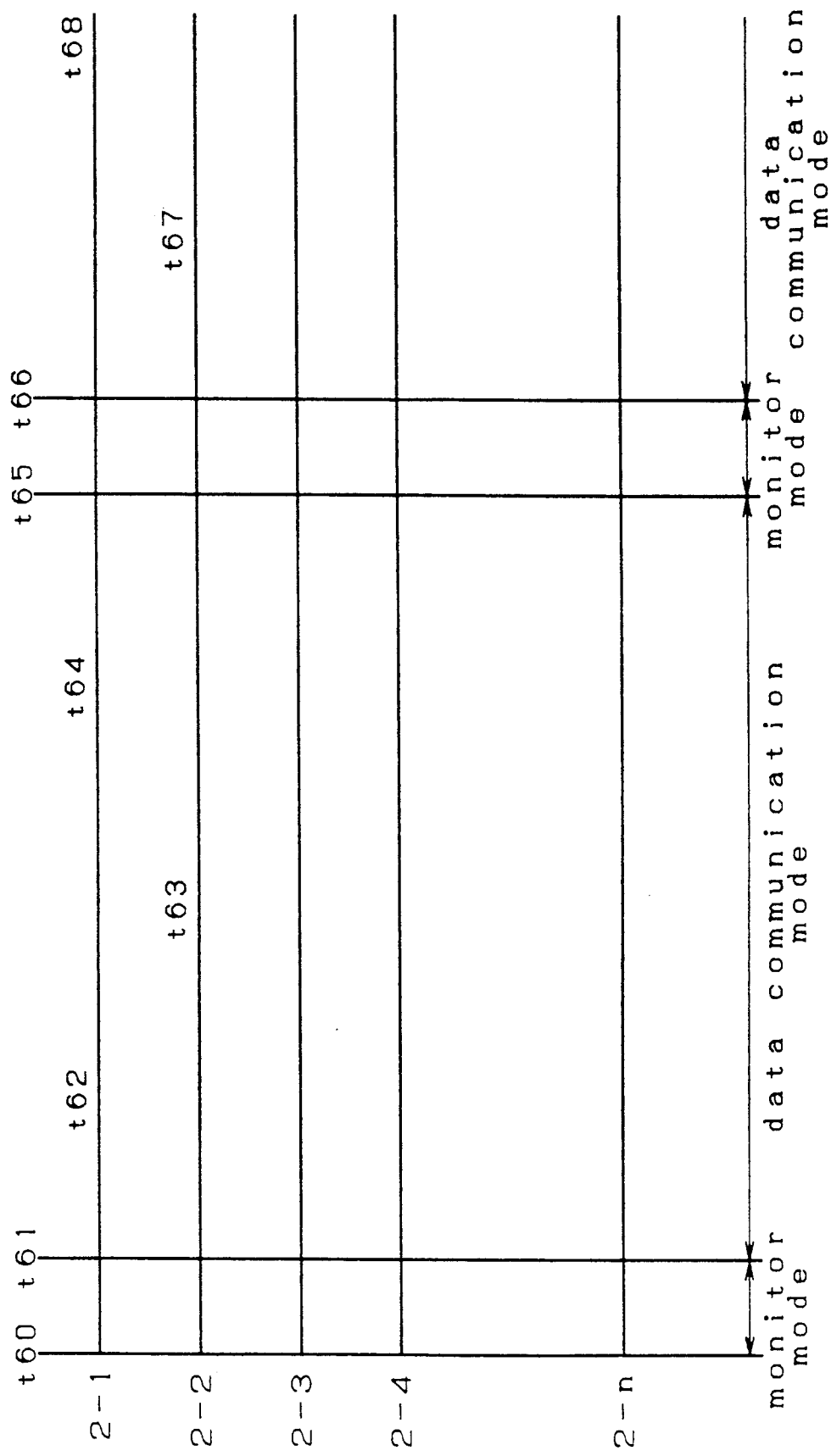
FIG. 20 is a time chart showing the manner in which the token is passed from one data communication terminal to another in the local area network system according to the second embodiment of the present invention.
Figure 21:
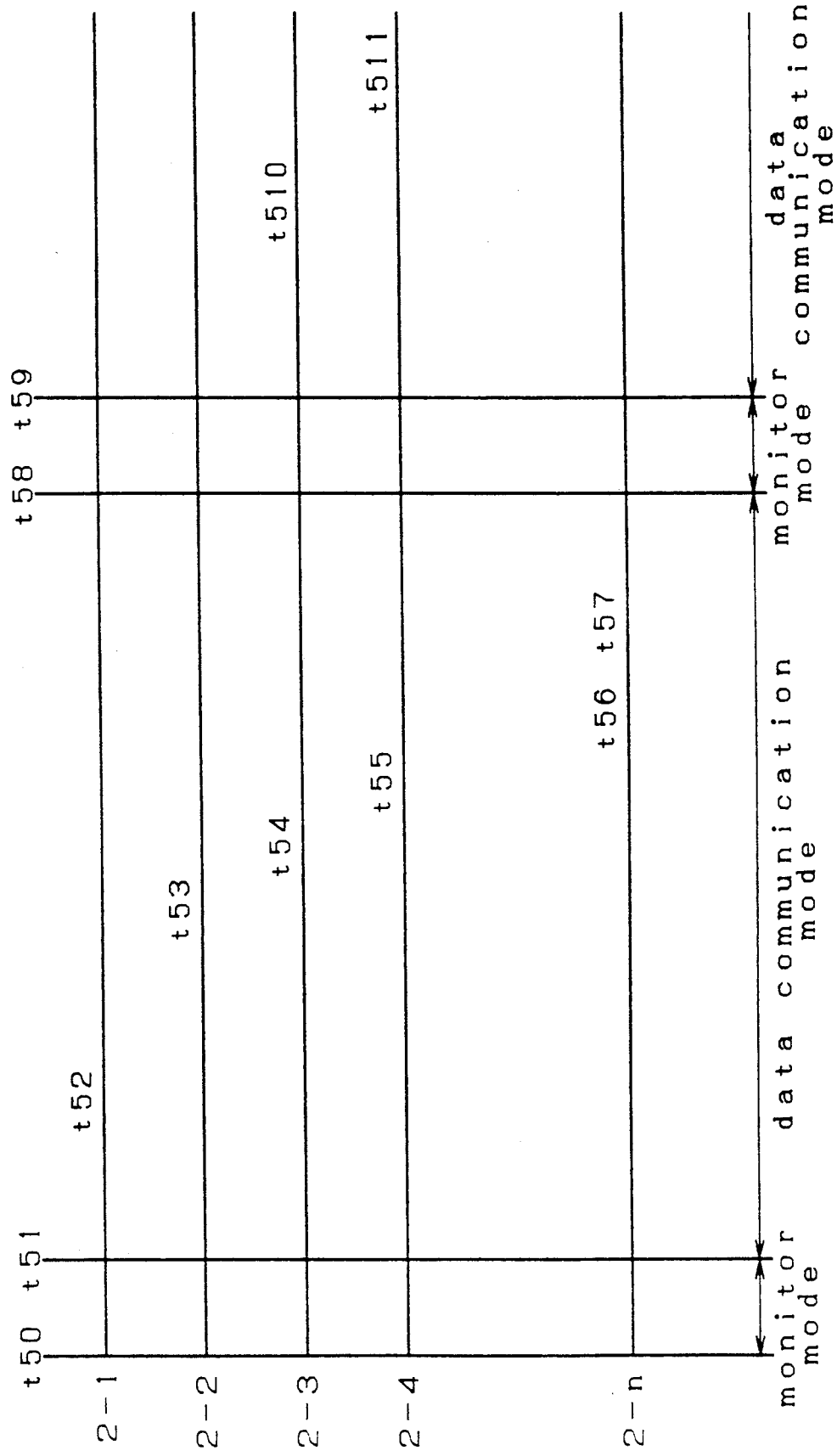
FIG. 21 is a time chart showing the manner in which the token is passed from one data communication terminal to another in another local area network system given here for comparison.

The operating condition of each of the data communication terminals when the token is passed is shown in FIG. 20. For comparison, FIG. 21 shows the manner of passing the token according to another local area network. It can be seen that the time intervals t54 through t57 shown in FIG. 21 for passing the token to the data communication stations 2-4 through 2-n which do not require data transmission are eliminated in the embodiment given in FIG. 20.

Thus, according the local area network system of this embodiment, since the recipient of the token is determined according to the operating condition of each of the data communication terminals, the token is more frequently passed to those data communication terminals which have a higher level of demand for the token, and delay in data transmission can be avoided even when a large number of data communication terminals are connected to the network. Also, by using a fuzzy deduction process for computing the levels of demand, it is possible to configure the system in such a manner that it may able to adapt itself to the change in its operating condition in a flexible manner.

Figure 22:
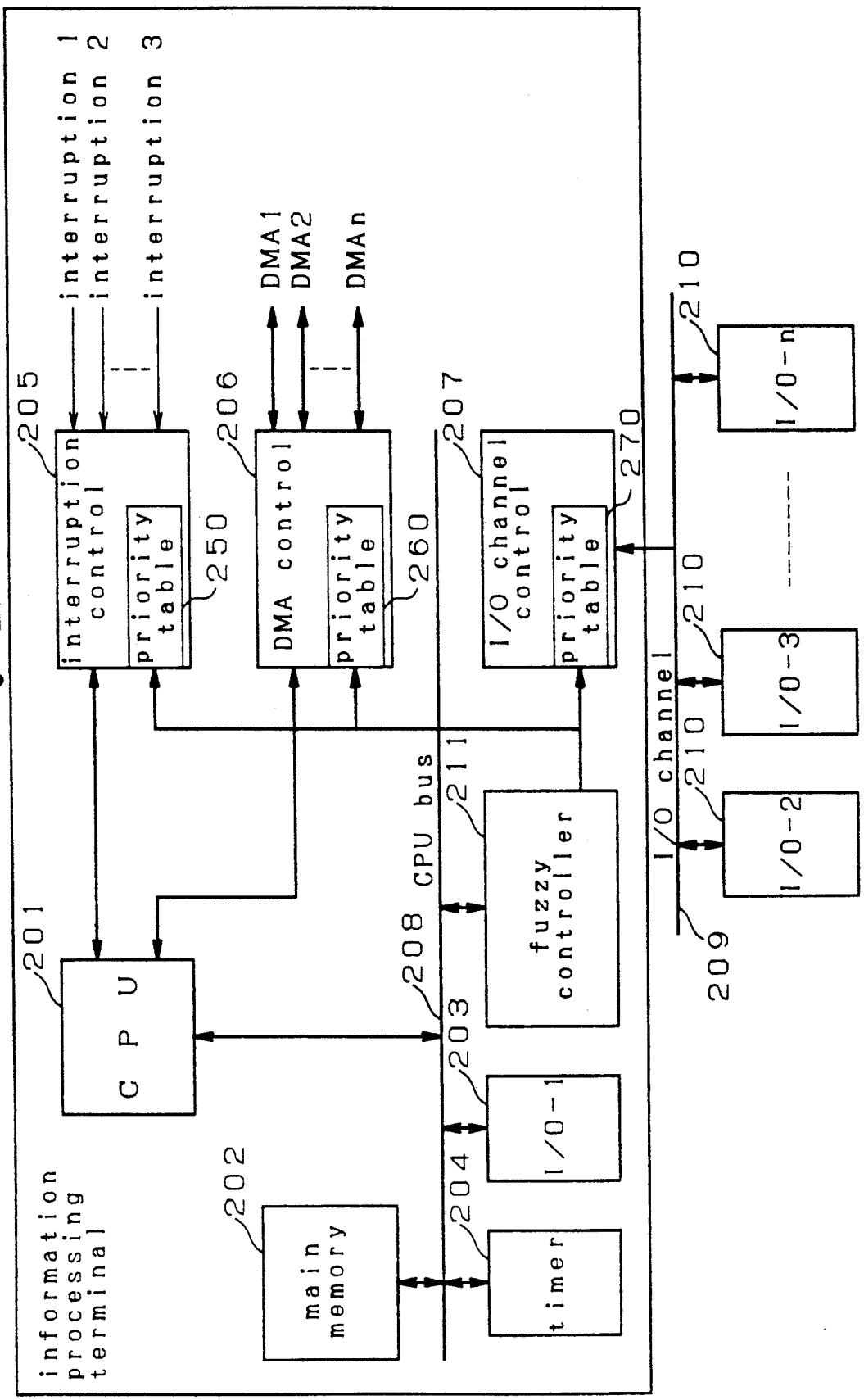
FIG. 22 is a view showing the structure of an information processing terminal according to a third embodiment of the present invention.

FIG. 22 shows the structure of a third embodiment of the communication network system according to the present invention.

The particular embodiment given here consists of an information processing terminal. This information processing terminal consists of a CPU 201, a main memory unit 202, an I/O unit 203, a timer 204, an interruption control unit 205, a DMA control unit 206, an I/O channel control unit 207, and a CPU bus 208, and the I/O channel control unit 207 is connected to a plurality of I/O units 210 via I/O channels 209. The interruption control unit 205, the DMA control unit 206 and the I/O channel control unit 207 are equipped with priority tables 250, 260 and 270, respectively, for defining the priority levels (levels of processing priority) for these control units. For instance, the interruption control unit 205 controls interruption demands for interruption processes 1 through n, and the priority table 250 stores the levels of processing priority for these interruption processes 1 through n. The higher the level is, the higher the priority is. Likewise, the priority table 260 of the DMA control unit 206 stores the processing priority levels for DMA demands from DMA1 through DMAn. The priority table 270 of the I/O channel control unit 207 stores the processing priority levels for I/O requests from the I/O units 210.

Figure 23:
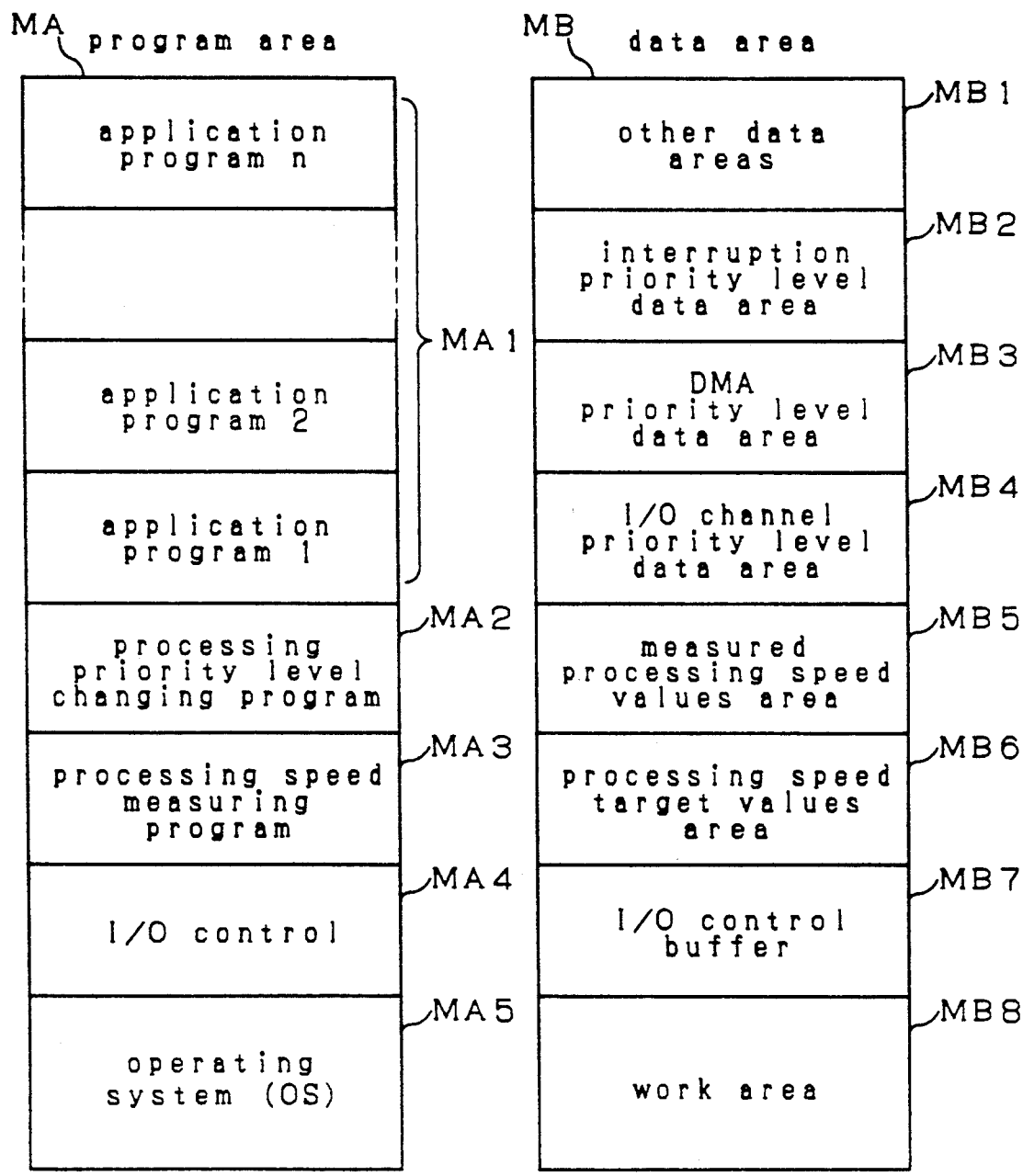
FIG. 23 is a memory map showing the structure of the main memory unit.

The main memory unit 202 has a memory layout as illustrated in FIG. 23, and consists of a program area MA and a data area MB. The program area MA consists of an area MA1 for storing a plurality of application programs, a program area MA2 for changing the processing priority levels in the interruption control unit 205, the DMA control unit 206 and the I/O channel control unit 207, a processing speed measuring program MA3 for measuring the processing speed for each task by using the timer 204, an area MA4 for storing an I/O control program, and an area MA5 for storing an operating system (OS). The data area MB consists of an area MB1 for storing various pieces of data, areas MB2, MB3 and MB4 for storing interruption priority level data, DMA priority level data and I/O channel priority level data, respectively, an area MB5 for storing the actual value of the processing speed for each task, an area MB6 for storing the target values of the processing speed, an I/O control buffer MB7, and a work area MB8.

This embodiment employs a fuzzy deduction process to optimize the priority levels. Specifically, as illustrated in FIG. 22, the information processing terminal comprises a fuzzy controller 211 connected to the CPU bus 208 as well as the CPU 201 and the main memory unit 202. This fuzzy controller 211 carries out a fuzzy arithmetic operation according to input information supplied from the CPU 201, and rewrites the priority tables 250, 260 and 270 provided in the interruption control unit 205, DMA control unit 206 and I/O channel control unit 207.

Figure 25:
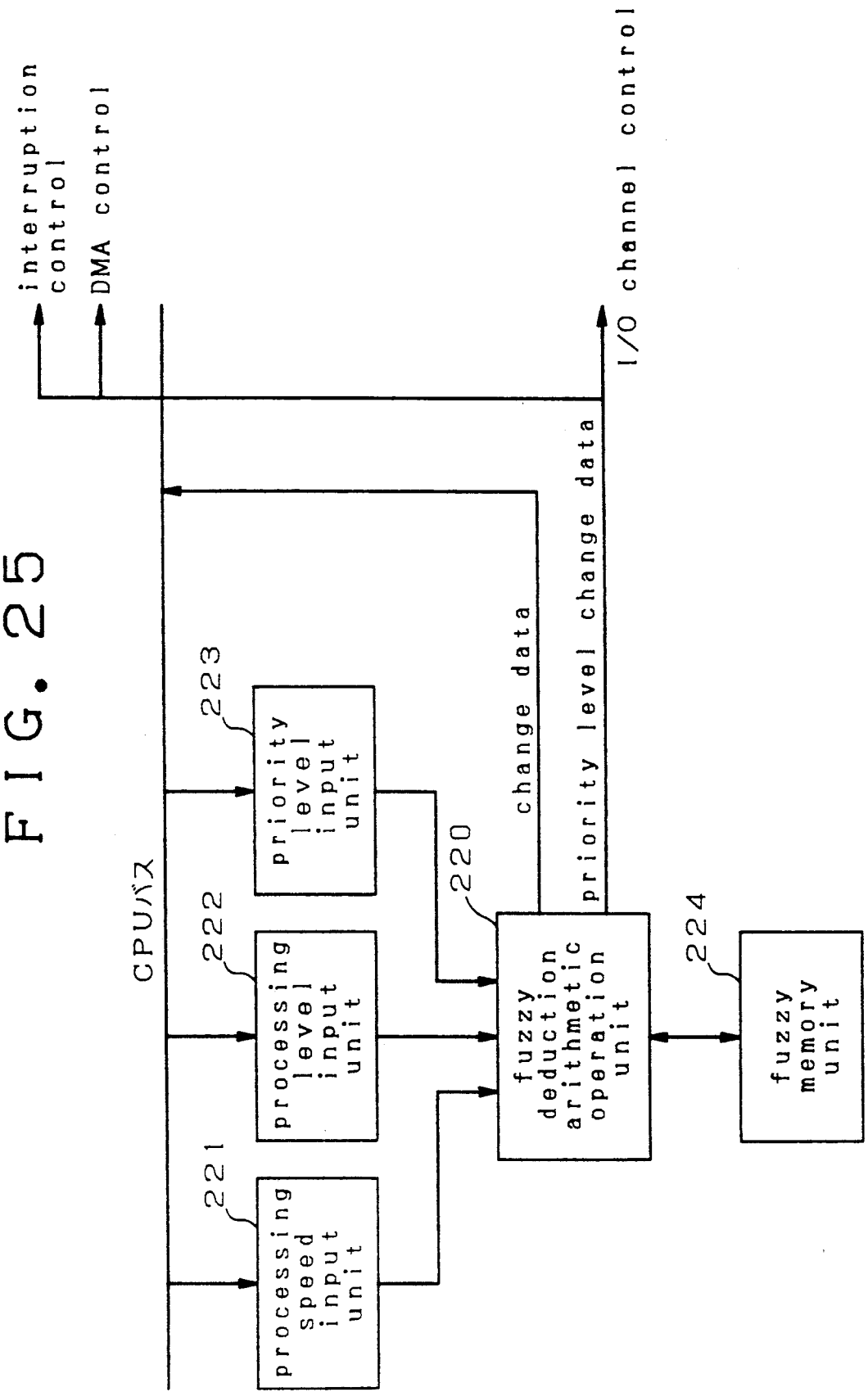
FIG. 25 is a block diagram of the fuzzy controller.

FIG. 25 is a view illustrating the structure of this fuzzy controller 211. This fuzzy controller 211 comprises a fuzzy deduction arithmetic operation unit 220, a processing speed input unit 221 for receiving a value of measured processing speed for each task as one item of input information for fuzzy arithmetic operation, a processing level input unit 222 for receiving a processing level (given as a level of importance) for each task, a priority level input unit 223 for receiving a current priority level of the control content of each task from the CPU, and a fuzzy memory unit 224 for storing membership functions and fuzzy rules. The fuzzy arithmetic operation unit 220 uses the processing speed which was measured in carrying out the task in question on the previous occasion, the processing level of this task (either high or low), and the current priority level of the control contents in carrying out this task as input information in setting up (or changing) the priority level of the control contents in carrying out this task, and creates priority level changing data serving as a basis for changing the current priority level to supply it to the corresponding table according to the fuzzy rules and the membership functions which are stored in the fuzzy memory unit 224 in advance.

Figure 27:
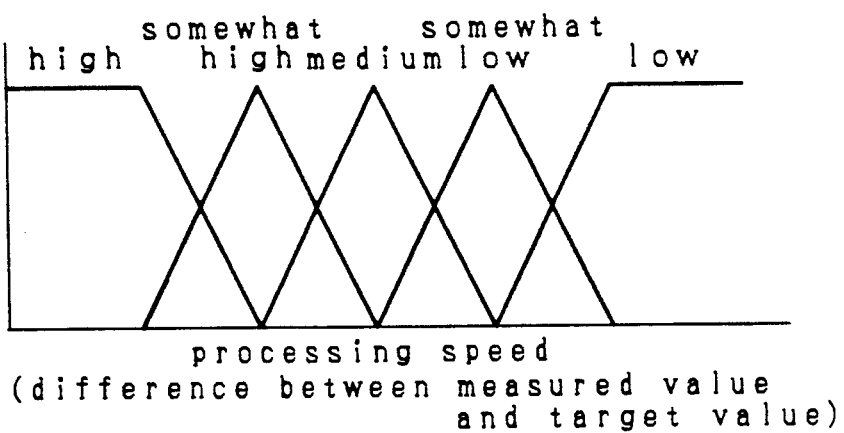
FIGS. 27 through 29 show the membership functions used in this embodiment.
Figure 28:
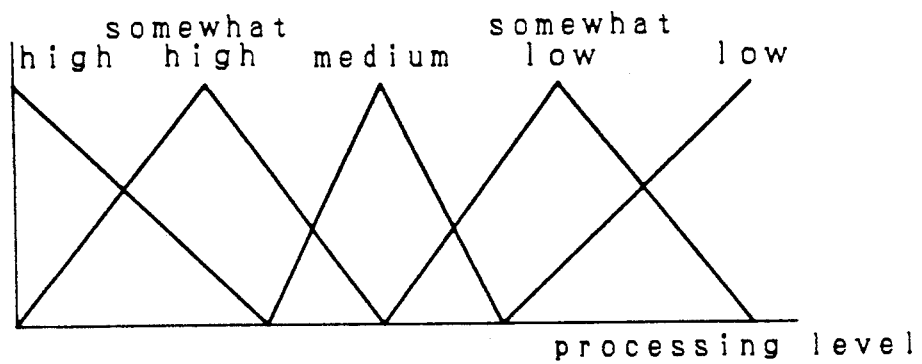
Figure 29:
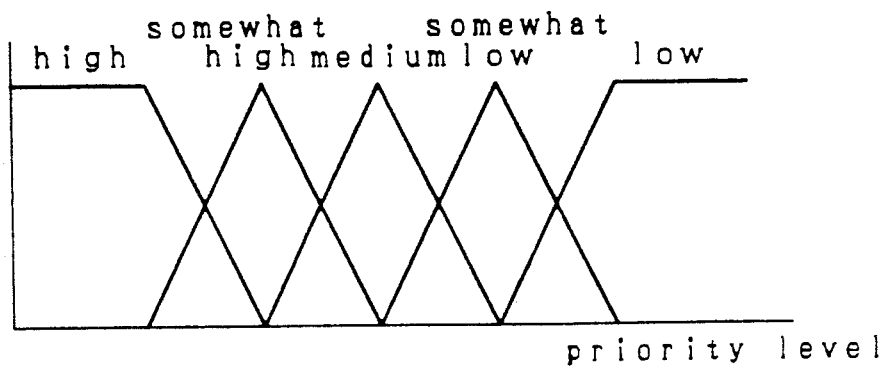

FIG. 26 shows a part of the fuzzy deduction rules stored in the fuzzy memory unit 224, and FIGS. 27 through 29 shows the membership functions stored in the fuzzy memory unit 224. FIG. 27 shows membership functions each of which uses the difference between the processing speed or the actually measured value of the processing speed on the previous occasion and a predetermined target value as its input variable. FIG. 28 shows membership functions which use the processing level as their input variable. FIG. 29 shows membership functions which use the priority level as their input variable. The membership functions given in FIGS. 27 through 29 are those corresponding to the conditions of fuzzy rules. The membership functions corresponding to the results of fuzzy rules are now shown in the drawings, but are identical to those shown FIG. 29 in configuration.

In the information processing terminal having the above described structure, when the system is started up and an arbitrary application program is executed, the processing speed is measured by using the timer 204 for each of the tasks of the application program which is being executed. The processing speed measuring program stored in the area MA3 is used for this measurement process, and the measured values of the processing speed are stored in the area MB5 as actually measured values. Meanwhile, since the target value of the processing speed for each particular task is stored in the area MB6, after the processing speed measuring program is executed, the processing priority level changing program in the area MA2 is executed, and, by comparing the actual values and the target values of the processing speed, the processing priority levels are changed in such a manner that, for instance, the processing speed is increased when the actually measure value is lower than the corresponding target value. If the execution of the task in question is carried out by DMA control, the corresponding processing priority changing program rewrites the priority table 260 as well as the DMA priority level data area in the area MB3. If the task is carried out by interruption control, the contents of the interruption priority level data area MB2 and the priority table 250 are rewritten. If the task is carried out by I/O channel control, the contents of the I/O channel priority level data area MB4 and the priority table 270 are rewritten. The rewriting of the processing priority levels is carried out according to the results of comparison between the actually measured values and the target values, and how much the priority levels may be raised is determined according to the magnitudes of the results of comparison. It is also possible to raise and lower the priority level only by one notch each time.

The execution of the programs stored in the area MS2 and MS3 may be carried out either in the background of the execution of the application programs or during the idle time of the CPU 201.

Figure 24:
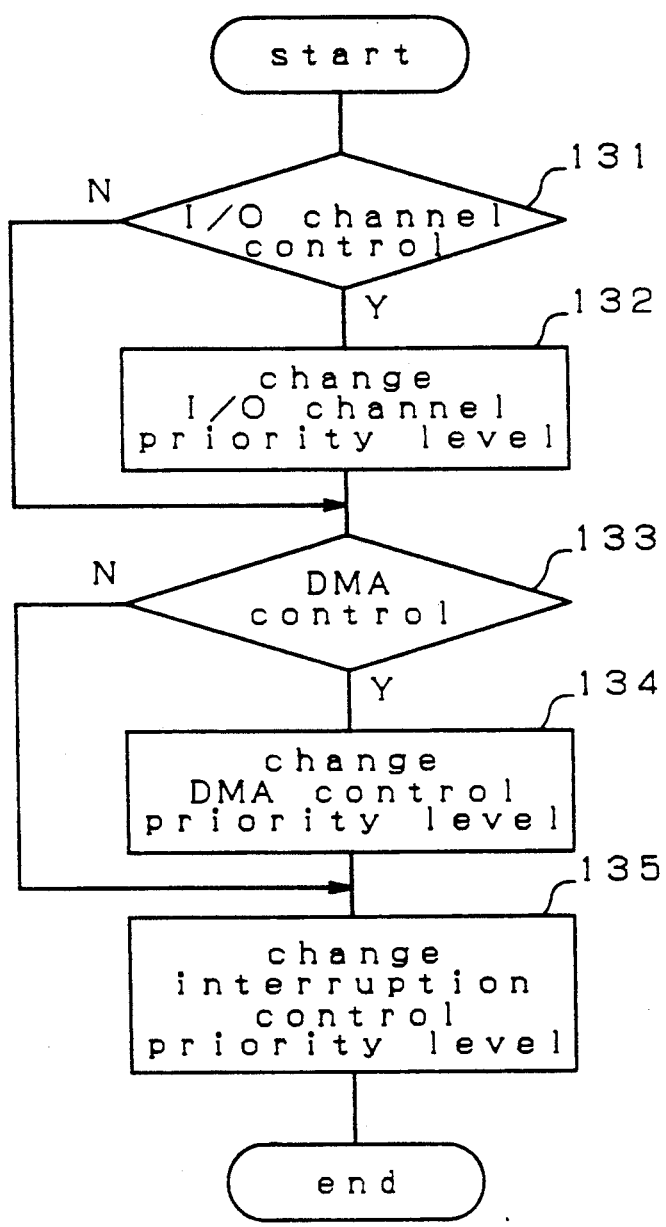
FIG. 24 is a flow chart showing the outline of the operation of the processing priority level changing program.

FIG. 24 outlines the operation of the above mentioned priority level changing program. Specifically, it is determined if the current task is based on I/O channel control, DMA control or interruption control in steps 131 and 133, and the priority level of each control is changed in steps 132, 134 and 135. In each of these steps for changing the priority levels, a comparison is made between the measured value and the target value of the processing speed, and the priority level is changed according to the result of this comparison process.

The fuzzy arithmetic operation based on the membership functions given in FIGS. 27 through 29 is carried out, for instance, as given in the following.

When the fuzzy arithmetic operation unit 220 is activated while executing a certain task, the fuzzy arithmetic operation unit 220 receives various pieces of information from the processing speed input unit 221, the processing level input unit 22, and the priority level input unit 223 as its input values. The processing speed for carrying out the task in question on the previous occasion is applied to the membership functions in FIG. 27, and its degrees of membership to the membership functions of various labels, "fast", "somewhat fast", "medium", "somewhat slow", and "slow", are evaluated. Likewise, the processing level at the time is applied to the membership functions in FIG. 28. Further, the current priority level of the control contents (for instance DMA1 of DMA control) in executing the task in question is applied to the membership functions in FIG. 29. According to the degrees of membership thus obtained, the speed level serving as the condition of a fuzzy rule is selected by using the mini rule of the known mini-max rule. Additionally, by using the max rule, the slicing of the results of the membership functions is carried out according to the degrees of membership to the conditions of the fuzzy rules, and trapezoidal shapes are thus obtained as a result of the deduction process. Then, a logical sum of the thus obtained trapezoidal shapes is taken by using the max rule in a defuzzifying unit, and a gravitational center is outputted as a result of the deduction process. The deduced value is represented as data which indicates how many steps the current priority level should be raised (priority level changing data). In the control unit 205, 206 or 207 which is in question, the corresponding priority table 250, 260 or 270 is rewritten. The CPU reads out the contents of this priority table 250, 260 or 270 at appropriate timing, and stores it in the RAM. The above described process is carried out at a predetermined time interval, upon each completion of a certain task, in the background of executing a certain application program, or during a free time of the CPU 201.

According to the above described method for optimizing the priority level based on such a fuzzy arithmetic operation, one can obtain the advantage that the priority level can be more finely changed than that based on a simple arithmetic operation, and the optimizing arithmetic operation can be carried out at very high speed as it is based on fuzzy arithmetic operation.

Thus, according to the present invention, since the priority level is optimized during the normal operation of the system, the efficiency of data processing can be significantly improved, and the throughput of the system can be very much increased. In particular, by optimizing the priority level by using a fuzzy deduction process, it is also possible to carry out the optimizing process even more finely and at higher speed.

Figure 30:
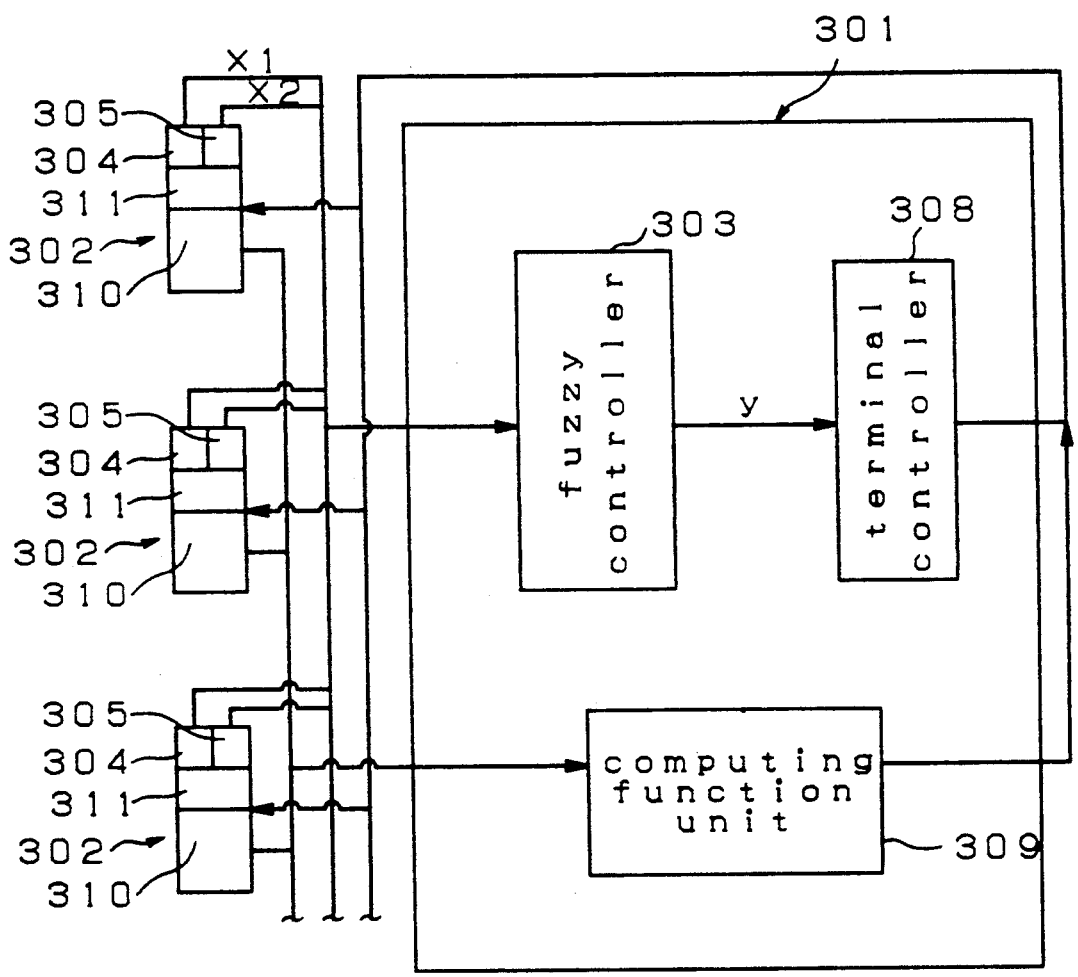
FIG. 30 is a block diagram illustrating the structure of a computer system given here as a fourth embodiment of the present invention.

FIG. 30 is an overall structural view of the waiting time control device for a terminal in computer system according to the present invention. In FIG. 30, numeral 301 denotes a computer, and numeral 302 denotes each of its terminals.

The computer 301 is further equipped with a fuzzy controller 303 for carrying out a fuzzy control on the waiting time period extending from the completion of the operation of the terminal 302 to the time point of the next allocation of the operation to the terminal 302, a terminal control unit 308 for controlling the terminals 302 according to a signal from the fuzzy controller 303, and a computing unit 309 for carrying out a computing operation according to the operation of the terminals 302. Each of the terminals 302 is provided with a first sensor 304 serving as first detecting means for detecting an operating speed, a second sensor 305 serving as second detecting means for detecting the operation start up preliminary time period extending from the time point at which the operation of the terminal is allowed to the time point at which the operation is actually started, an operation unit 310 for supplying a computing signal to the computer 301 according to an operation applied thereto, and a display unit 311 for displaying guiding information and contents of computation according to a signal from the computer 301.

For instance, when the terminal 302 is about to be operated, an operation start up guide display is made on the display unit 311 according to a signal from the computer 301, and the operator operates the terminal according to this information. When the operation is completed, the display of the next start up information is made. The above mentioned waiting time period is a time period between the completion of the operation of the terminal and the time point at which the display of information on the next start up operation is displayed. The operating speed is the amount of input for a given time period, and the start up preliminary time period is the time period between the time point at which the information on the next start up operation is displayed and a time point at which the operation is actually started. Normally, as the skill of the operator improves, the operating speed become greater, and the operation start up preliminary time period is reduced.

The fuzzy controller 303 carries out a fuzzy control on the waiting time period according to a plurality of fuzzy rules employing an operating speed signal x1 and an operation start up preliminary signal x2 received from the associated sensors 304 and 305 as condition variables, and the waiting time period y as a result variable, in combination with the use of membership functions of the condition variables x1 and x2 and the result variable y allocated for different fuzzy labels.

The fuzzy controller 303 stores a plurality of fuzzy rules having the form of if (condition) - then (result) statements based on the rule reference table illustrated in FIG. 31. In the fuzzy rules corresponding to the reference table illustrated in FIG. 31, x1 and x2 are condition variables given by the corresponding sensors 304 and 305, y is a result variable for the waiting time period, and PS, PM and PL are fuzzy labels of the fuzzy groups which are determined by the condition and result variables. The fuzzy labels related to x1 are PS or "slow", PM or "medium", and PL or "fast", and the fuzzy labels related to x2 and y are PS or "short", PM or "medium" and PL or "long". For instance, the rule 1 is given by [if x1=PS and x2=PS, then y=PM], and may be expressed by the language expression that "if the operating speed is slow and the operation start up preliminary time period is short, then the waiting time period is medium".

Figure 32:
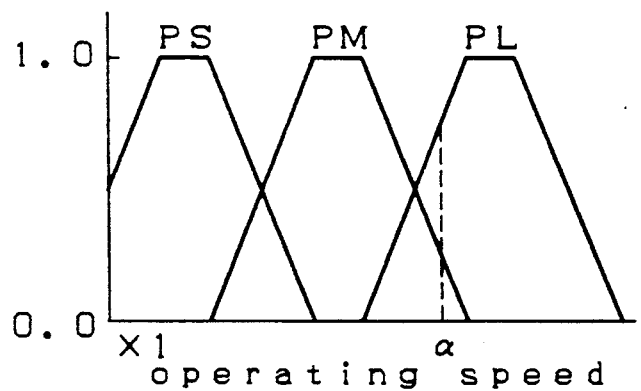
FIGS. 32 and 33 are graphs showing membership function condition variables.
Figure 33:
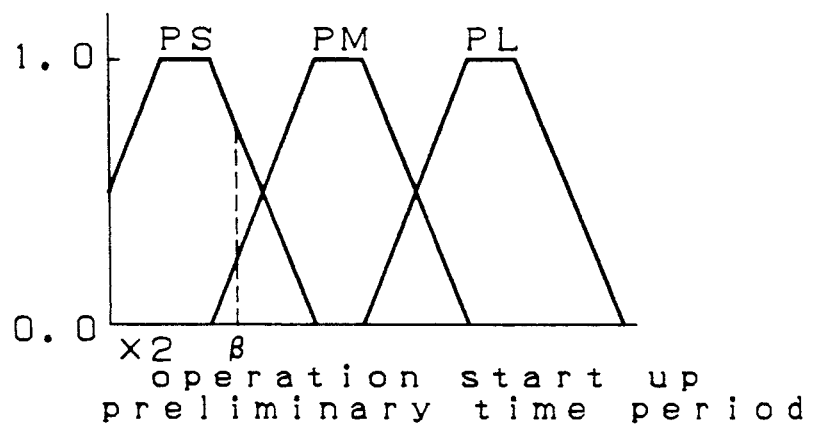
Figure 34:
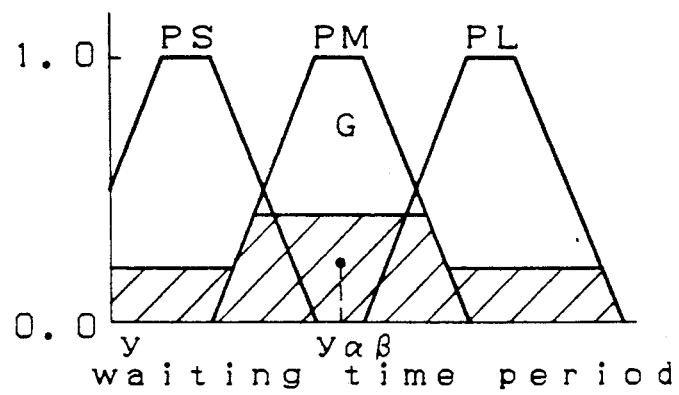
FIG. 34 is a graph showing membership function result variable.

The fuzzy controller 303 stores the membership functions of the condition variables x1 and x2 and the result variable y, as shown in FIGS. 32, 33 and 34. The horizontal axis of FIG. 32 indicates the operating speed, the horizontal axis of FIG. 33 indicates the operation start up preliminary time period, and the horizontal axis of FIG. 35 indicates the waiting time period.

Figure 35:
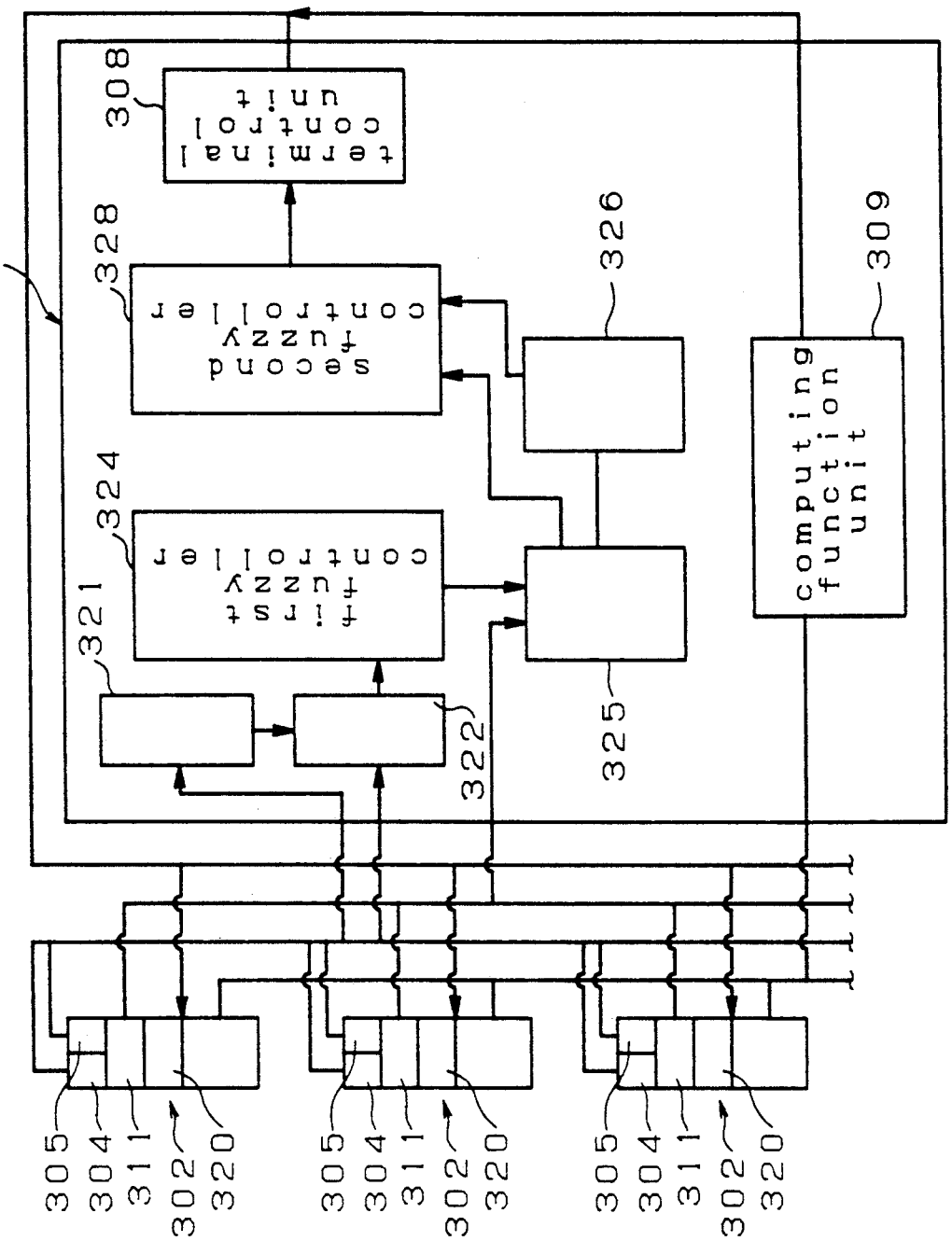
FIG. 35 is a block diagram of a fifth embodiment of the present invention similar to FIG. 30.

The action of the waiting time period control device is now described in the following with reference to FIGS. 32 and 35.

Based on the signals $x1=\alpha$ and $x2=\beta$ given from the sensors 304 and 305 and from FIGS. 33 and 34, one can obtain membership values adapted to the membership functions corresponding to the associated fuzzy rules as $PSf(\alpha)=0$, $PMf(\alpha)=0.3$, $PLf(\alpha)=0.6$, $PSf(\beta)=0.8$, $PMf(\beta)=0.2$, and $PLf(\beta)=0$. For each of the fuzzy rules, the least value of the degree of membership of each of the condition variables x1 and x2 is selected as the adaptability of the condition variable (min arithmetic operation). For instance, in rule 1, since the values of the degrees of membership for the respective condition variables are [0, 0.8], the adaptability of the condition is [0]. Each of the membership functions related to y is thus sliced according to the adaptability of the condition in each of the rules as shown in FIG. 34, and the sliced membership functions related to y are then superimposed one over the other (max arithmetic operation). There is thus produced a data signal which is related to the waiting time period $y_{\alpha\beta}$ of a point corresponding to the gravitational center of the superimposed shapes, and this data signal is supplied to the terminal control unit 308 so that it may be used to adjust the waiting time period accordingly at each of the terminals 302 according to this data signal.

In this way, it is given with a short waiting time period if the terminal 302 is operated by a skilled operator, and with a long waiting time period if not. Thereby, a skilled operator is allowed to use the computer 301 for a relatively long period of time while an unskilled operator can used the computer 301 for an appropriate amount of time which would not cause fatigue to the operator. As a result, the computer system can be utilized in an efficient manner.

Now a fifth embodiment is described in the following with reference to FIG. 35. In FIG. 35, the parts corresponding to the various parts of FIG. 30 are denoted with like numerals.

In this embodiment, each terminal 302 is equipped with a waiting time period sensor 320 in addition to what the terminal shown in FIG. 30 is equipped with. Meanwhile, the computer 301 is equipped with an average value computing unit 321 for computing average values of an operating speed and an operation start up preliminary time period according to data thereon, a deviation value computing unit 322 for computing deviation values of the operating speed and the operation start up preliminary time period according the average value data obtained from the average value computing unit 321, a first fuzzy controller 324 for outputting a waiting time period by carrying out a fuzzy deduction process using the deviation values of the operating speed and the operating speed preliminary time period as input variables, a comparison unit 325 for computing a comparison value Ta/Tb comparing the waiting time period Ta obtained as a result of the fuzzy deduction process and the actual current waiting time period Tb obtained from the waiting time period sensor 320 of the terminal 302, a variation detecting unit 326 for detecting the variation in the comparison value Ta/Tb with time, a second fuzzy controller 328 for deducing the allocation priority of each of the terminals 302 using the comparison value and the variation value as input variables, and a terminal control unit 308 for controlling the work allocation for each of the terminals 302 according to the priority level data obtained from the second fuzzy controller 328.

Figure 37:
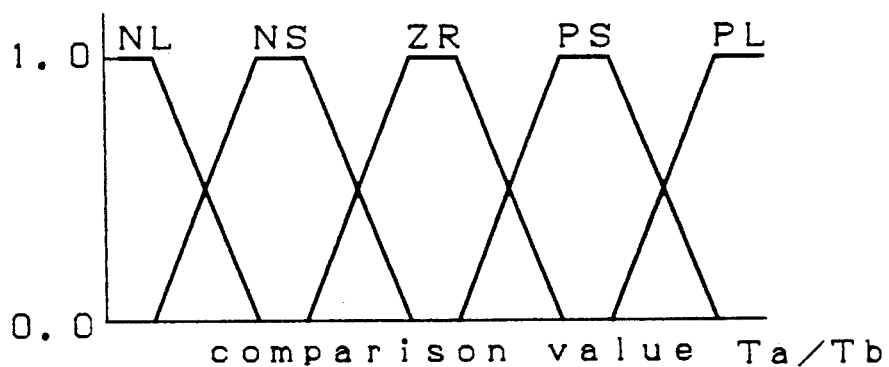
FIGS. 37 and 38 are graphs showing membership function condition variables.
Figure 38:
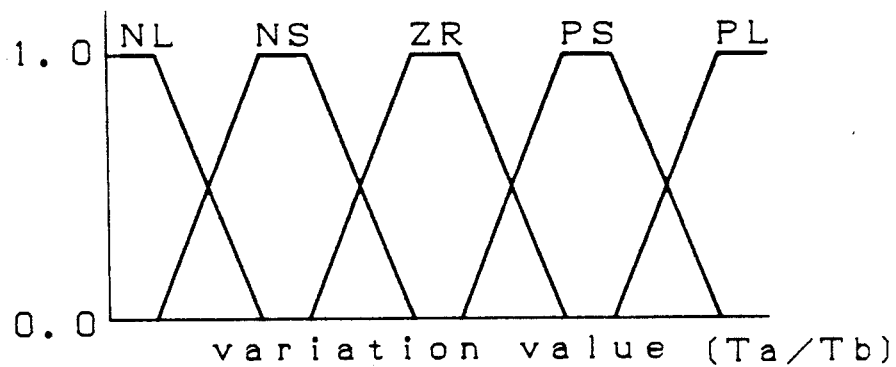
Figure 39:
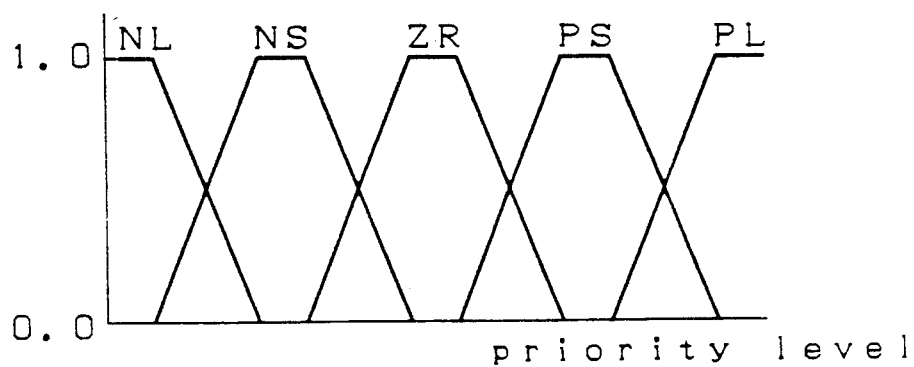
FIG. 39 is a graph showing membership function result variable.

FIG. 36 shows a rule reference table corresponding to various fuzzy rules used by the second fuzzy controller 328 in carrying out its fuzzy deduction process, FIGS. 37 and 38 show examples of the membership function conditions related to the comparison value and its variation value, and FIG. 39 shows the membership function results which are related to the priority level. The fuzzy labels in each of the membership functions consist of five levels, NL (very small), NS (somewhat small), ZR (medium), PS (somewhat large), and PL (very large).

In this embodiment, by provision of the second fuzzy controller 328, the allocation control of the terminals 302 is not directly carried out according to the waiting time period data obtained as a result of the deduction process by the first fuzzy controller 324, but by obtaining an allocation priority level through a fuzzy deduction process based on a waiting time period signal, and carrying out the allocation control in a more precise manner according to the obtained allocation priority data.

As can be understood from the above discussion, according to the present invention, since the waiting time period control for each terminal is carried out according to the operating speed and the operation start up preliminary period at the terminal, the operation allocation to each terminal is carried out according to the skill of the operator using this particular terminal, and a more efficient operation of the computer system is made possible.

Figure 40A:
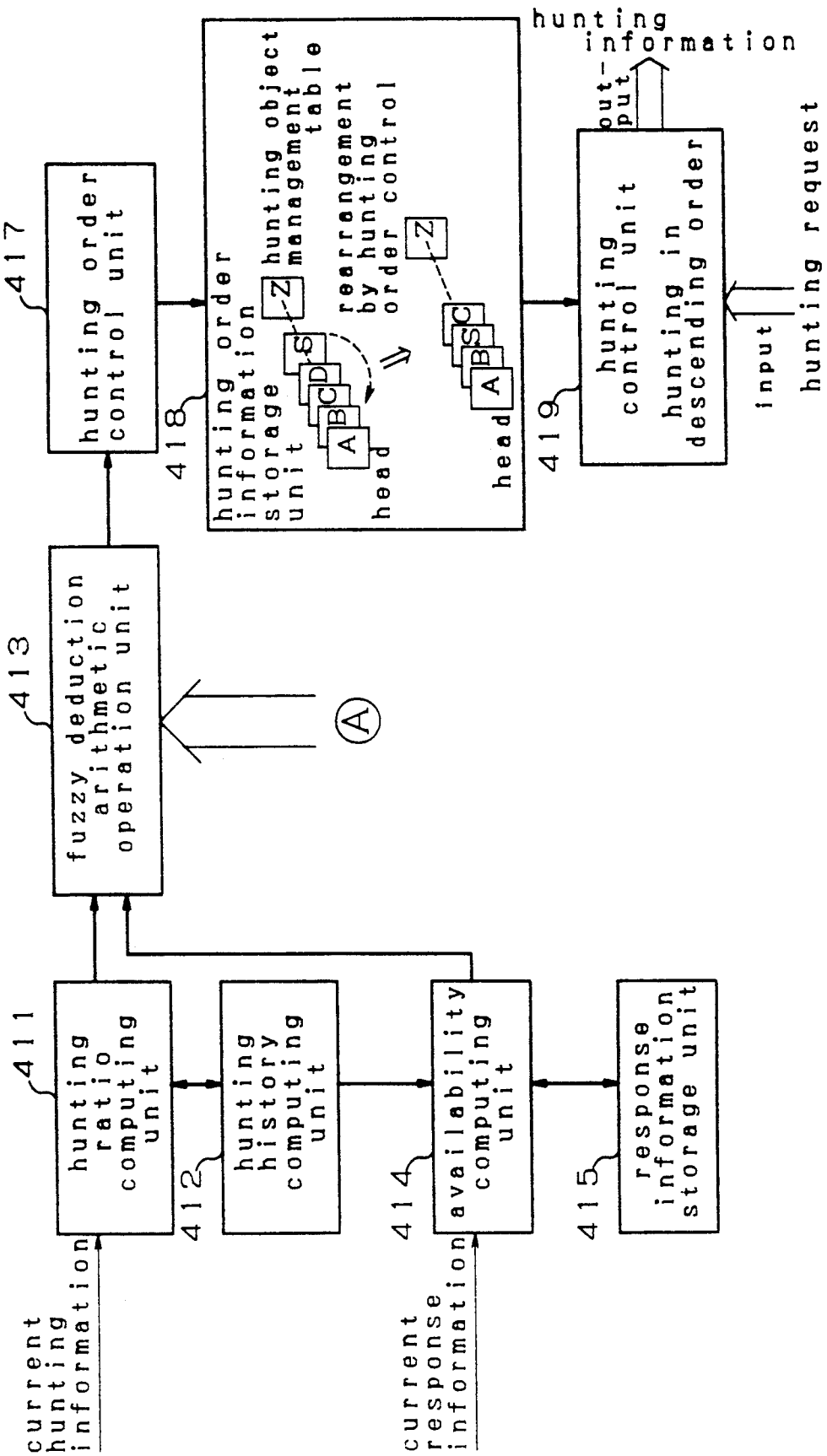
FIGS. 40(a) and 40(b) are block digrams showing the structure of the hunting order control device according to a sixth embodiment of the present invention.
Figure 40B:
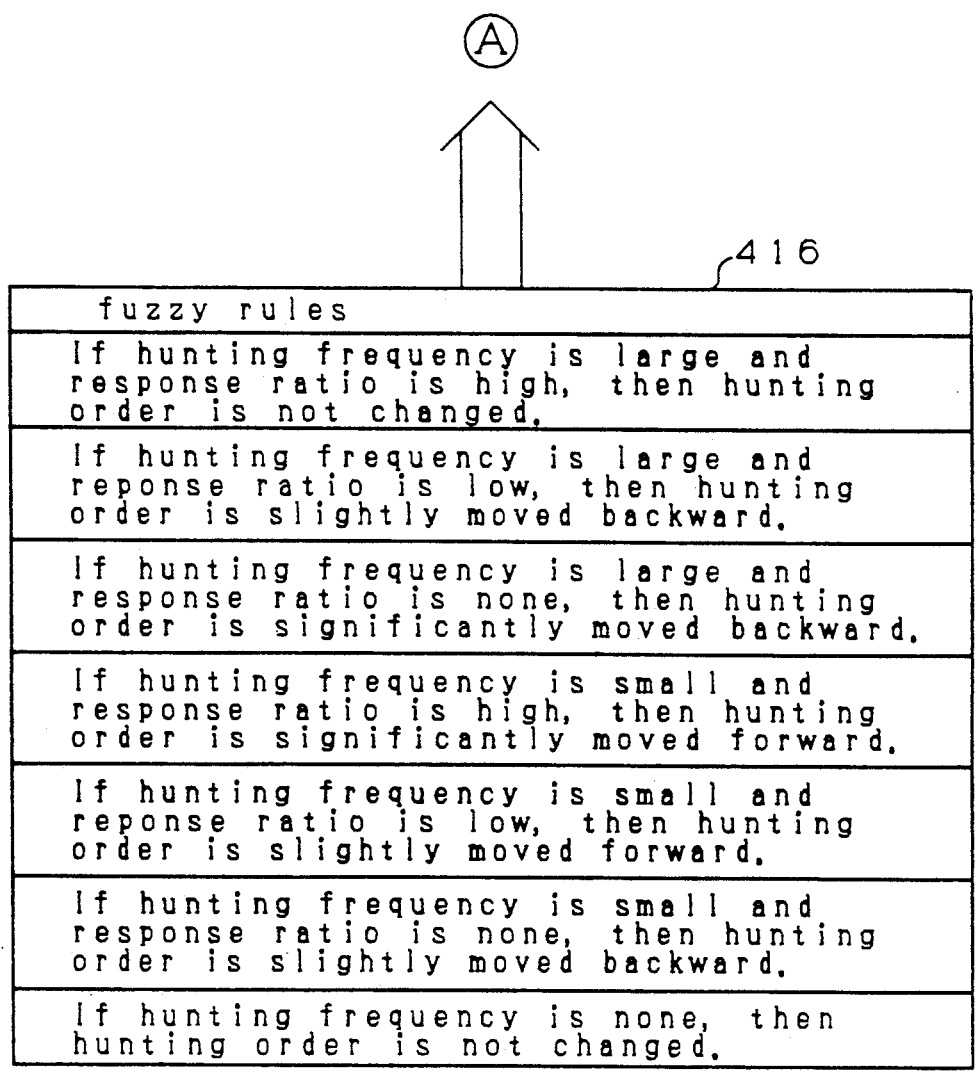

FIGS. 40(*a*) and 40(*b*) is a block diagram illustrating the functional structure of a hunting order control device given here as a sixth embodiment of the present invention. The exchange system to which the hunting order control device of the present invention is applied is equipped with a representative number (key number) call receiving capability, and the hunting process in a representative number receiving mode is described in the following.

Referring to this drawing, a hunting ratio arithmetic operation unit 411 stores current hunting information entered therein in its hunting history storage unit 412, computes a hunting ratio for each of the connected lines according to the stored hunting information, and sends it to a fuzzy deduction arithmetic operation unit 413. The hunting ratio is defined as the ratio of the frequency of hunting with respect to a particular communication line up to the current time point to the total frequency of hunting (the number of representative number calls) with respect to the entire communication lines.

Meanwhile, a response possibility arithmetic operation unit or a response availability arithmetic operation unit 414 stores current response information entered therein in its response information storage unit 415, computes a received call response ratio for each of the lines connected thereto from the response information stored in its storage unit 415 and the hunting information stored in the storage unit 412, and sends it to a fuzzy deduction arithmetic operation unit 413. The received call response ratio is defined as the ratio of the frequency of the responses when this particular line is hunted to the total frequency of the received calls. This ratio, in short, gives an estimation of the possibility of obtaining a response when this particular line is hunted.

The fuzzy deduction arithmetic operation unit 413 computes an optimum output value according to the levels of membership (membership values) of the entered hunting ratio and received call response ratio to the corresponding membership functions, through a certain fuzzy deduction process which is based on the fuzzy rules given in the block 416, fuzzify its result into a hunting order modification amount, and sends it to a hunting order control unit 417.

The fuzzy rules stored in the block 416 each use the entered hunting ratio and hunting response ratio as the conditions and the hunting order modifying amount as the result, and define output values, each corresponding to a particular combination of input values, in the form of language information (fuzzy labels).

The hunting order control unit 417 modifies a hunting object management table stored in its hunting order information storage unit 418. In this drawing, a modification amount to shift the line s is outputted from the fuzzy deduction arithmetic operation unit 413, and the line s is shifted to the third position from the top. The hunting order information storage unit 418 sends the updated order information contained in the hunting object management table to a hunting control unit 419.

The hunting control unit 419 searches the hunting object management table when a hunting is requested by the exchange system which has received a call at its representative number call receiving mode, and outputs the name of the top most line as hunting information in a sequential manner.

FIG. 41 shows other examples of fuzzy rules, and further finely classifies the rules indicated in the block 416 of FIGS. 40(*a*) and 40(*b*). The entered hunting ratio and received call response ratio are indicated by four kinds of fuzzy labels, ZR, PS, PM and PL for their different values, and output values are denoted by seven kinds of fuzzy labels, NL, NM, NS, ZR, PS, PM and PL so as to correspond to the 16 different combinations of the input values. By using these finely classified rules, it is possible to create and update highly precise hunting orders.

Figure 42:
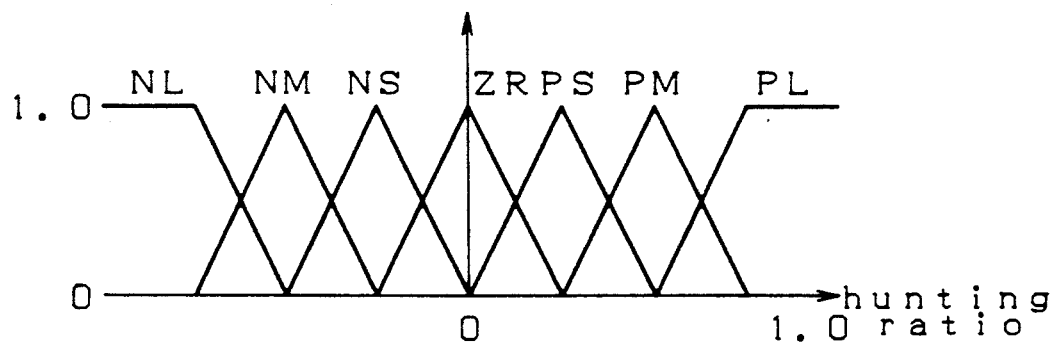
FIGS. 42 through 44 are graphs showing membership functions which are defined in the fuzzy deduction arithmetic operation unit.
Figure 43:
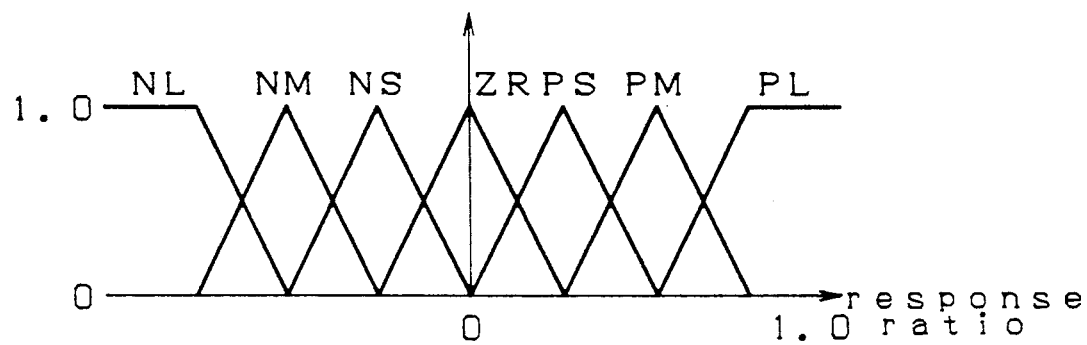
Figure 44:
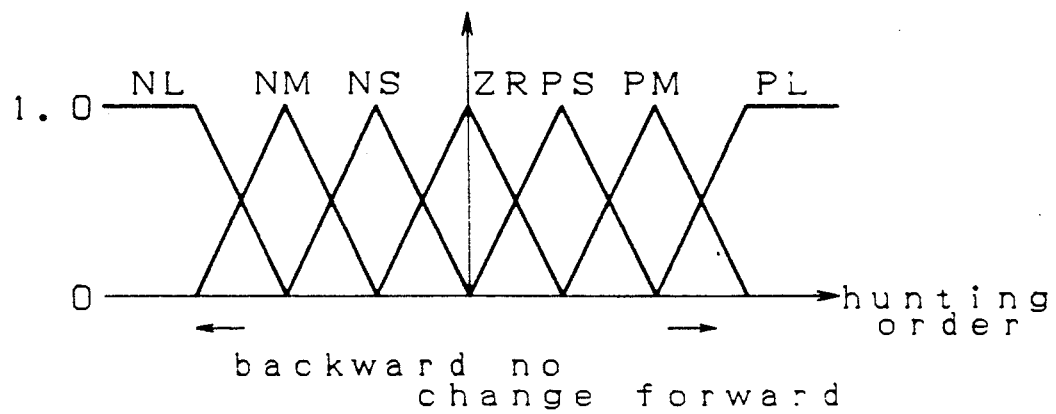

FIGS. 42 through 44 show graphs representing the membership functions which are utilized for fuzzifying the hunting ratio and the received call response ratio received by the fuzzy deduction arithmetic operation unit 413, and de-fuzzifying the result of the arithmetic operation into specific hunting order modification amounts. FIG. 42 shows membership functions indicating the levels of membership of the input values of the hunting ratios and the different fuzzy labels. FIG. 43 shows membership functions indicating the levels of membership of the input value of the received call response ratio to different fuzzy labels. The horizontal axes of these graphs represent the levels of the input values.

FIG. 44 shows membership functions which are related to the hunting order modification amount which is to be outputted.

Figure 45:
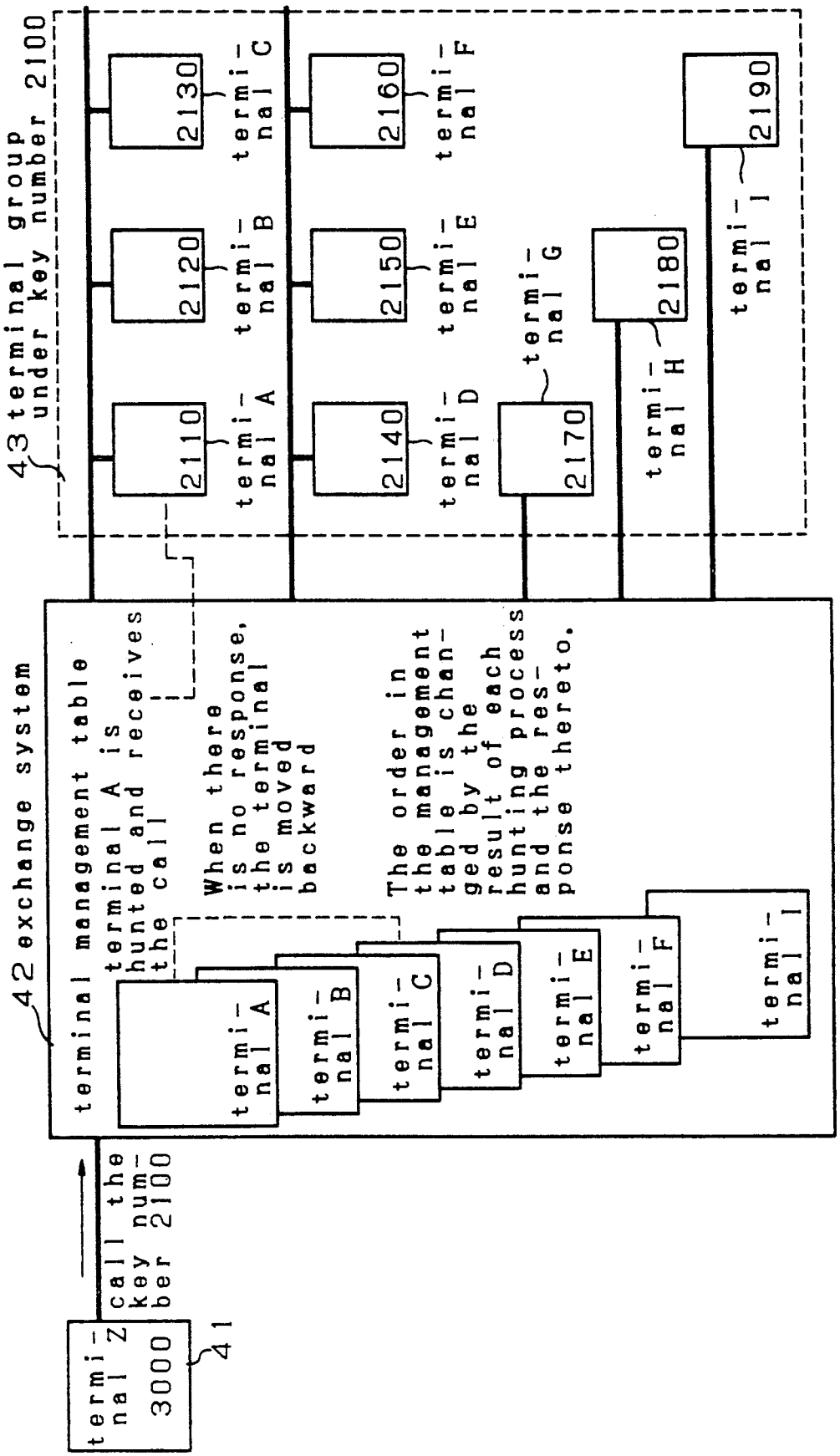
FIGS. 45 and 46 are diagrams showing the outline of the process carried out by the exchange system to which the device of the present invention is applied at its initial stage and during its operation, respectively.
Figure 46:
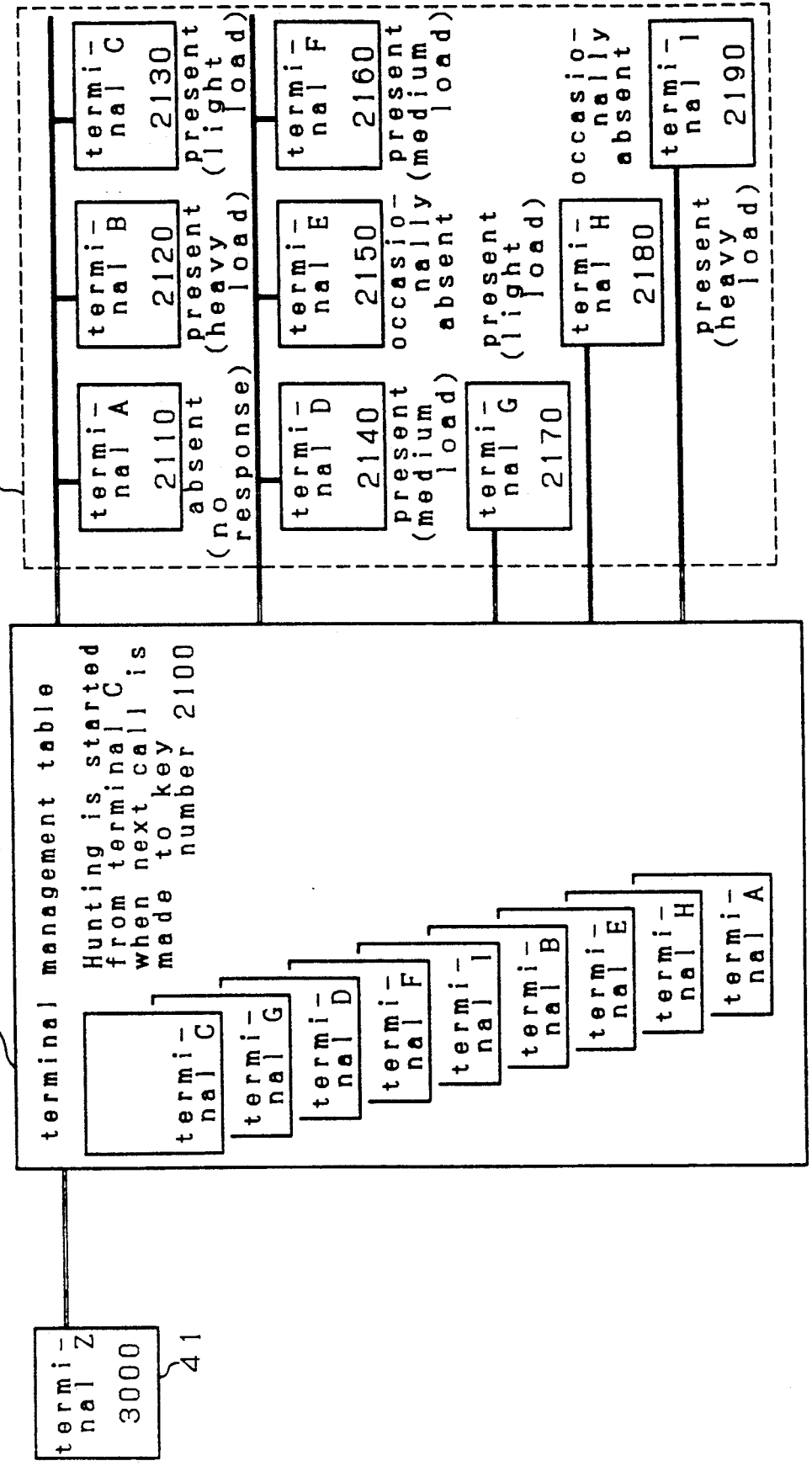

FIGS. 45 and 46 illustrate the output line of the process carried out by the exchange system to which the present invention is applied, and FIG. 45 corresponds to the state when the system is being configured while FIG. 46 corresponds to the state when the system is being operated.

Referring to these drawings, to the exchange system 442 equipped with a representative number call receiving capability are connected terminals A through I which are subordinate to the representative number (key number) or which can be accessed by the common representative number. The terminals A through C and the terminals D through F are connected thereto by the bus type connection, and the terminals G, H and I are connected thereto by the star type connection.

Referring to FIG. 45, when a call is placed from a terminal 441 designating a representative number "2100", this call is received by the exchange system 442 corresponding to this number. Upon receiving this representative number call, the exchange system 442 starts hunting one of the terminals A through I in the terminal group 443 which are subordinate to the representative number. The terminal that is selected here is the terminal A which is placed in the first position in a terminal management table provided in the exchange system 442.

When the terminal A is hunted, and the call is received thereby, the reception of the call and the result of response are recorded. When there is no response to the call to the terminal A, the terminal A is shifted from the first position to the last position in the terminal management table. In this way, the order in the terminal management table is changed according to the result of the hunting which took place upon reception of each call at the representative number, and the response from the terminal group 443 to this call.

FIG. 46 shows an example how the terminal management table in the exchange system is modified according to the manner and the result of the response made by the illustrated terminal group 443. The terminals, such as the terminals C and G, which are available, have high response ratios, and have so far received relatively small numbers of calls, are placed at the beginning of the table, the terminal such as the terminal A which is not available and has a poor response ratio is placed at the end of the table, and the terminal H which has a poorest response next to the terminal A is placed second from the last. As a result, when the next representative number call is received, the terminal C is first hunted, and it is followed by the terminal G.

In configuring the system in this fashion, the order of hunting the terminals arbitrarily set up in the terminal management table as illustrated in FIG. 45 is modified as each hunting process is completed so that a high response ratio may be obtained, and calls are evenly distributed among different terminals. Those terminals having poor response ratios such as the terminal A may gradually rise in the order of hunting as they respond to the hunting no matter how infrequent they may be.

According to the above described hunting order control device, the result of the hunting process and the response thereto are recorded every time a representative number call is received, and the hunting ratio and the received call response ratio are computed up to the moment according to this record for each of the lines so that the modification of the hunting order may result in a fair distribution of call reception by taking into account the response possibility of each of the lines.

As a result, an optimum hunting process adapted to the particular operating conditions of the subordinate terminals is carried out at all time, and an efficient operation of the system is made possible.

As an additional advantage, there is no need to consider the initial order of the terminals in the terminal management table in the exchange system during the process of configuring the system, and they may be arranged in an arbitrary manner.

Furthermore, since the order in the terminal management table is modified by each reception of an incoming representative number call, the calls would not concentrate on any particular terminals, and the terminals are hunted in an even more even manner.

Also, the exchange system simply searches the terminal management table and hunts the terminal position at the beginning of the table every time a representative number call is received, and its process to select the terminals which are to be hunted is much simplified.

Although the present invention has been described in terms of specific embodiments, it is possible to modify and alter details thereof without departing from the spirit of the present invention.

What we claim is:

1. A communication network system, comprising:
   a communication line network;
   a plurality of terminals for transmitting data connected to said communication line network; and
   a fuzzy control unit for allocating a right to access said communication network according to a fuzzy deduction process based upon said data being transmitted to said fuzzy control unit.

2. A communication network system according to claim 1, wherein said terminals comprise a master station and a plurality of slave stations, said master station comprising:
   polling means for performing a polling on each of the slave stations according to a prescribed polling cycle, and for acknowledging whether each of said slave stations is active according to a response therefrom;
   storing means for temporarily storing a name of said acknowledged active station and said transmitted data;
   arranging means for assigning only those slave stations acknowledged to be active as objects of said polling by referring to said memory means during a non-polling period;
   collecting means for collecting said transmitted data of each of said active slave stations, and temporarily storing said data;
   determining means for determining a polling cycle corresponding to a data transmission requirement of each of said slave stations by means of a fuzzy deduction using membership functions based on said transmitted data stored in said temporary memory means; and
   processing means for executing said polling according to said polling cycle determined for each of said slave stations.

3. A communication network system according to claim 1, wherein said terminals comprise:
   a CPU;
   an interruption control unit;
   a DMA control unit; and
   an I/O channel control unit, wherein, data processing speeds of various tasks of said CPU are actually measured, and said measured values are each compared with a target value so that priority levels of said interruption, DMA, and I/O channel control units may be changed and optimized by a fuzzy deduction process using differences between said actually measured values and said target values as input information.

4. A communication network system according to claim 1, wherein one of said terminals consists of a computer equipped with said fuzzy control unit, and said computer comprises:
   first detecting means for detecting an operating speed of one of said terminals; and
   second detecting means for determining an operation start up preliminary time period extending from a time point at which operation of said terminal is allowed to a time point at which operation of said terminal is actually started;
   said fuzzy control unit carrying out a fuzzy control on a waiting time period extending from a completion of operation of said terminal to a time point at which a next operation is allocated according to fuzzy rules and membership functions allocated with different fuzzy labels based on condition variables relating to an operating speed and an operation start up preliminary time period obtained from input signals supplied by the first and second detecting means.

5. A communication network system according to claim 1, wherein priority of data communication for each of said terminals is controlled by passing a token from one terminal to another, each of said terminals comprising:
   means for exchanging said information to others of said terminals at a certain timing; and
   means for determining an order of passing said token from those terminals having a relatively higher demand for said token to those having a relatively lower demand for said token.

6. A communication network system according to claim 1, wherein said communication network consists of a telephone exchange system having a representative number call receiving capability, and one of said terminals is selected by a hunting process for receiving an incoming call whenever such a call is made to a representative number wherein said fuzzy control unit comprises:

first storing means for storing a hunting order of said terminals;

second storing means for storing a frequency of hunting processes and a frequency of response calls for each of said terminals;

first computing means for computing a ratio of said frequency of hunting processes for each of said terminals to said overall frequency of hunting processes for said entire system;

second computing means for computing a response call ratio during said hunting processes for each of said terminals;

determining means for determining an order of carrying out each of said hunting processes on said terminals so as to optimize an operating efficiency of said system according to said computed hunting ratio and response call ratio for each of said terminals through a fuzzy deduction process making use of membership functions; and changing means for changing said hunting order stored in said hunting order storage means according to said determined hunting order for each of said terminals.

7. A communication network system according to claim 2, wherein said transmitted data comprises, in part:

a number of requests to transmit data by said slave station for a given unit of time;

an amount of data transmitted for said given unit of time; and an elapsed time from a previous time point of data transmission wherein said determining means provides a polling interval value as a result of said fuzzy deduction.

* * * * *